United States Patent
Hu et al.

(10) Patent No.: US 10,630,592 B2
(45) Date of Patent: Apr. 21, 2020

(54) ROUTING METHOD, RELATED DEVICE, AND SYSTEM

(71) Applicant: HUAWEI TECHNOLOGIES CO., LTD., Shenzhen, Guangdong (CN)

(72) Inventors: Shihai Hu, Beijing (CN); Peng Ma, Beijing (CN); Bing Dang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

(21) Appl. No.: 15/857,748

(22) Filed: Dec. 29, 2017

(65) Prior Publication Data
US 2018/0123960 A1 May 3, 2018

Related U.S. Application Data

(63) Continuation of application No. PCT/CN2015/082876, filed on Jun. 30, 2015.

(51) Int. Cl.
*H04L 12/803* (2013.01)
*H04L 12/707* (2013.01)
(Continued)

(52) U.S. Cl.
CPC ............ *H04L 47/125* (2013.01); *H04L 45/22* (2013.01); *H04L 45/24* (2013.01); *H04L 45/28* (2013.01);
(Continued)

(58) Field of Classification Search
CPC ....... H04L 47/11; H04L 47/125; H04L 47/21; H04L 45/22; H04L 45/24; H04L 45/28; H04L 45/38; H04L 45/64
See application file for complete search history.

(56) References Cited

U.S. PATENT DOCUMENTS

2013/0054761 A1*  2/2013  Kempf ............... H04L 12/4633
                                                             709/220
2014/0241362 A1*  8/2014  Bosshart .............. H04L 69/22
                                                             370/392
(Continued)

FOREIGN PATENT DOCUMENTS

CN        101291290 A    10/2008
CN        101335714 A    12/2008
(Continued)

OTHER PUBLICATIONS

Braun et al., "Load-Dependent Flow Splitting for Traffic Engineering in Resilient OpenFlow Networks", Mar. 9-12, 2015, IEEE, 2015 International Conference and Workshops on Networked Systems (NetSys), pp. 1-5 (Year: 2015).*
(Continued)

*Primary Examiner* — Paul H Masur
(74) *Attorney, Agent, or Firm* — Fish & Richardson P.C.

(57) ABSTRACT

The application provides a routing method which includes configuring a first path and a second path in charge of load sharing for a data flow, and configuring a third path in charge of reroute protection. A first group entry is generated for instructing the forwarding device to use the first path and the second path as load-sharing paths and use the third path to perform reroute protection on the first path and the second path. A flow entry for instructing to perform an operation of going to the first group entry is generated.

15 Claims, 8 Drawing Sheets

---

A forwarding device receives a flow entry and a first group entry from a control device, where the flow entry is used to instruct the forwarding device to perform an operation of going to the first group entry when a data flow is matched, the first group entry is used to instruct the forwarding device to set a first path and a second path in at least three paths computed by the control device for the data flow as load-sharing paths and set a third path in the at least three paths as a reroute protection path for the first path and the second path, and the at least three paths are paths for transmitting the data flow from the forwarding device to a destination forwarding device — 201

The forwarding device creates a flow table according to the flow entry, and creates a first group table according to the first group entry — 202

(51) Int. Cl.
*H04L 12/721* (2013.01)
*H04L 12/703* (2013.01)
*H04L 12/715* (2013.01)
*H04L 12/801* (2013.01)
*H04L 12/819* (2013.01)

(52) U.S. Cl.
CPC .............. *H04L 45/38* (2013.01); *H04L 45/64* (2013.01); *H04L 47/11* (2013.01); *H04L 47/21* (2013.01)

(56) References Cited

U.S. PATENT DOCUMENTS

| | | | |
|---|---|---|---|
| 2015/0295818 A1 | 10/2015 | Hayashitani et al. | |
| 2016/0182363 A1 | 6/2016 | Li et al. | |
| 2016/0344633 A1* | 11/2016 | Jiao | H04L 29/06 |

FOREIGN PATENT DOCUMENTS

| | | | | |
|---|---|---|---|---|
| CN | 102957603 | A | 3/2013 | |
| CN | 103716208 | A | 4/2014 | |
| CN | 103782552 | A | 5/2014 | |
| CN | 103986651 | A | 8/2014 | |
| EP | 2922248 | A1 | 9/2015 | |
| EP | 3029893 | A1 | 6/2016 | |
| WO | 2014077313 | A1 | 5/2014 | |
| WO | 2014139558 | A1 | 9/2014 | |
| WO | WO-2015032027 | A1 * | 3/2015 | ............ H04L 45/22 |

OTHER PUBLICATIONS

Capone et al., "Detour Planning for Fast and Reliable Failure Recovery in SDN with OpenState", Mar. 24-27, 2015, IEEE, 2015 11th International Conference on the Design of Reliable Communication Networks (DRCN), pp. 25-32 (Year: 2015).*
Braun Wolfgang et al: "Load-dependent flow splitting for traffic engineering in resilient OpenFlow networks",2015 International Conference and Workshops on Networked Systems (NETSYS), IEEE, Mar. 9, 2015, XP032764867, 5 pages.
Anonymous: "OpenFlow Switch Specification version 1.4.0", Oct. 14, 2013, XP055412660, 206 pages.
Extended European Search Report issued in European Application No. 15896774.5 dated May 5, 2018, 12 pages.
CN Office Action in Chinese Appln. No. 201580066873.5, dated Apr. 19, 2019, 21 pages (with English translation).
International Search Report and Written Opinion in International Application No. PCT/CN2015/082876, dated Mar. 23, 2016, 19 pages.
OpenFlow Switch Specification Version 1.5.1, Open Networking Foundation, Mar. 26, 2015, ONF TS-025, 283 pages.

* cited by examiner

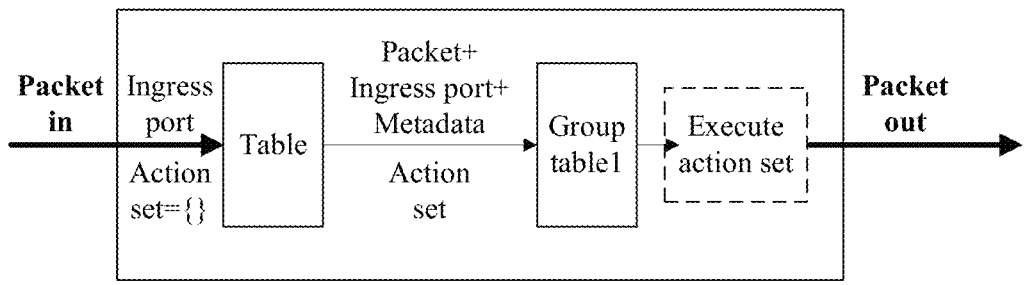

FIG. 3

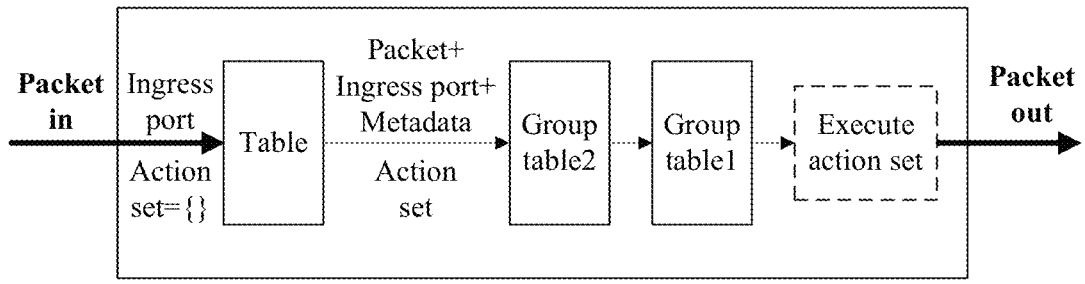

FIG. 4

A forwarding device receives a flow entry and a first group entry from a control device, where the flow entry is used to instruct the forwarding device to perform an operation of going to the first group entry when a data flow is matched, the first group entry is used to instruct the forwarding device to set a first path and a second path in at least three paths computed by the control device for the data flow as load-sharing paths and set a third path in the at least three paths as a reroute protection path for the first path and the second path, and the at least three paths are paths for transmitting the data flow from the forwarding device to a destination forwarding device — 201

The forwarding device creates a flow table according to the flow entry, and creates a first group table according to the first group entry — 202

FIG. 5

ROUTING METHOD, RELATED DEVICE, AND SYSTEM

CROSS-REFERENCE TO RELATED APPLICATIONS

This application is a continuation of International Application No. PCT/CN2015/082876, filed on Jun. 30, 2015, the disclosure of which is hereby incorporated by reference in its entirety.

TECHNICAL FIELD

The application relates to the field of network communications technologies, and in particular, to a routing method, a related device, and a system.

BACKGROUND

A software-defined network SDN (software-defined network) system is a new network architecture in which control is separated from management. Key components of the SDN system include an OpenFlow OpenFlow switch and a control device. Message exchange and information transfer between the control device and the OpenFlow switch are completed by using a control channel according to the OpenFlow protocol specification. On the switch device, a data forwarding layer is separated from a control layer, and underlying hardware is virtualized, that is, data is forwarded on the OpenFlow switch, and data forwarding is controlled on the control device. The control device implements management and control functions by using a network-wide view, and generates a forwarding flow table for the OpenFlow switch. The OpenFlow switch forwards a data packet according to the forwarding flow table.

However, in a network environment in which multiple load-sharing paths are configured, when a next hop of any one of the multiple load-sharing paths fails, a conventional SDN network based on the OpenFlow protocol does not support an operation of performing fast rerouting on the failed load-sharing path.

SUMMARY

The application provides a routing method, a related device, and a system to resolve a problem that reroute protection cannot be implemented when there are multiple load-sharing paths in a network and any one of the load-sharing paths fails.

According to a first aspect, the application provides a routing method, applied to a network in which control is separated from forwarding, where the network in which control is separated from forwarding includes a control device and a forwarding device, the control device controls the forwarding device, and the method includes:

determining, by the control device, at least three paths for a data flow, and generating a first group entry and a flow entry for the data flow, where the at least three paths are paths for transmitting the data flow from the forwarding device to a destination forwarding device; and sending, by the control device, the flow entry and the first group entry to the forwarding device, where the flow entry is used to instruct the forwarding device to perform an operation of going to the first group entry when the data flow is matched, and the first group entry is used to instruct the forwarding device to set a first path and a second path in the at least three paths as load-sharing paths and set a third path in the at least three paths as a reroute protection path for the first path and the second path.

With reference to the first aspect, in a first possible implementation of the first aspect, the first group entry includes a first group type field and a first action bucket field, the first group type field is used to indicate that a current group is a scenario including the load-sharing paths and the reroute protection path, and the first action bucket field is used to indicate that the first path and the second path are load-sharing paths for the data flow and that forwarding states of the first path and the second path are both active, and used to indicate that the third path is a rerouting path when the load-sharing path fails and that a forwarding state of the third path is inactive.

With reference to the first possible implementation of the first aspect, in a second possible implementation of the first aspect of the application, the first action bucket field includes a first sub action bucket, a second sub action bucket, and a third sub action bucket, the first sub action bucket indicates that the first path is a load-sharing path for the data flow and that the forwarding state of the first path is active, the second sub action bucket indicates that the second path is a load-sharing path for the data flow and that the forwarding state of the second path is active, and the third sub action bucket indicates that the third path is a rerouting path when the load-sharing path fails and that the forwarding state of the third path is inactive.

Optionally, when the load-sharing path fails, an identifier field corresponding to the load-sharing path is in an inactive state, and the third identifier field is in an active state.

With reference to the first aspect, or the first or the second possible implementation of the first aspect, in a third possible implementation of the first aspect, the first group entry further includes a first group identifier; and that the flow entry is used to instruct the forwarding device to perform an operation of going to the first group entry when the data flow is matched includes:

the flow entry includes a match field and an operation instruction field, the match field carries match information of the data flow, and the operation instruction field carries the first group identifier for instructing to go to the first group entry.

Optionally, the first group entry further includes a first group identifier, the flow entry includes a match field and an operation instruction field, the match field carries match information of the data flow, and the operation instruction field carries the first group identifier for instructing to go to the first group entry.

With reference to any one of the first aspect, or the first to the second possible implementations of the first aspect, in a fourth possible implementation of the first aspect, the method further includes:

further generating, by the control device, a second group entry for the data flow, where the second group entry includes a second group identifier, a second group type field, and a second action bucket field, the second group identifier is used to identify the second group entry, the second group type field is used to indicate load sharing, the second action bucket field includes a fourth sub action bucket, and the fourth sub action bucket carries the first group identifier for instructing to go to the first group entry; and that the flow entry is used to instruct the forwarding device to perform an operation of going to the first group entry when the data flow is matched includes:

the flow entry includes a match field and an operation instruction field, the match field carries match information of the data flow, and the operation instruction field carries the second group identifier for instructing to go to the second group entry.

With reference to any one of the second to the fourth possible implementations of the first aspect, in a fifth possible implementation of the first aspect, after the sending, by the control device, the flow entry and the first group entry to the forwarding device, the method further includes:

receiving, by the control device, a first notification message from the forwarding device, where the first notification message indicates that the first path fails;

setting, by the control device according to the first notification message, a forwarding state of the first sub action bucket to inactive and a forwarding state of the third sub action bucket to active; and sending, by the control device, the updated first group entry to the forwarding device.

With reference to the fifth possible implementation of the first aspect, in a sixth possible implementation of the first aspect, after the sending, by the control device, the updated first group entry to the forwarding device, the method further includes:

receiving, by the control device, a second notification message from the forwarding device, where the second notification message indicates that the first path recovers from the failure;

setting, by the control device according to the second notification message, the forwarding state of the first sub action bucket to active and the forwarding state of the third sub action bucket to inactive; and sending, by the control device, the first group entry that is updated again to the forwarding device.

With reference to any one of the second to the fourth possible implementations of the first aspect, in a sixth possible implementation of the first aspect, after the sending, by the control device, the flow entry and the first group entry to the forwarding device, the method further includes:

receiving, by the control device, a third notification message from the forwarding device, where the third notification message indicates that the first path fails;

setting, by the control device according to the third notification message, the first path corresponding to the first sub action bucket to a path used for rerouting, a forwarding state of the first sub action bucket to inactive, the third path corresponding to the third sub action bucket to a path used for load sharing, and a forwarding state of the third sub action bucket to active; and sending, by the control device, the updated first group entry to the forwarding device.

According to a second aspect, the application provides a routing method, applied to a network in which control is separated from forwarding, where the network in which control is separated from forwarding includes a control device and a forwarding device, the control device controls the forwarding device, and the method includes:

receiving, by the forwarding device, a flow entry and a first group entry from the control device, where the flow entry is used to instruct the forwarding device to perform an operation of going to the first group entry when the data flow is matched, the first group entry is used to instruct the forwarding device to set a first path and a second path in at least three paths computed by the control device for the data flow as load-sharing paths and set a third path in the at least three paths as a reroute protection path for the first path and the second path, and the at least three paths are paths for transmitting the data flow from the forwarding device to a destination forwarding device; and creating, by the forwarding device, a flow table according to the flow entry, and creating a first group table according to the first group entry.

With reference to the second aspect, in a first possible implementation of the second aspect, the first group entry includes a first group type field and a first action bucket field, the first group type field is used to indicate that a current group is a scenario including the load-sharing paths and the reroute protection path, and the first action bucket field is used to indicate that the first path and the second path are load-sharing paths for the data flow and that forwarding states of the first path and the second path are both active, and used to indicate that the third path is a rerouting path when the load-sharing path fails and that a forwarding state of the third path is inactive.

With reference to the first possible implementation of the second aspect, in a second possible implementation of the second aspect, the first action bucket field includes a first sub action bucket, a second sub action bucket, and a third sub action bucket, the first sub action bucket indicates that the first path is a load-sharing path for the data flow and that the forwarding state of the first path is active, the second sub action bucket indicates that the second path is a load-sharing path for the data flow and that the forwarding state of the second path is active, and the third sub action bucket indicates that the third path is a rerouting path when the load-sharing path fails and that the forwarding state of the third path is inactive.

With reference to the second aspect, or the first or the second possible implementation of the second aspect, in a third possible implementation of the second aspect, the first group entry further includes a first group identifier, the flow entry includes a match field and an operation instruction field, the match field carries match information of the data flow, and the operation instruction field carries the first group identifier for instructing to go to the first group entry.

With reference to the second aspect, or the first or the second possible implementation of the second aspect, in a fourth possible implementation of the second aspect, the method further includes:

receiving, by the forwarding device, a second group entry from the control device, and creating a second group table according to the second group entry, where the second group entry includes a second group identifier, a second group type field, and a second action bucket field, the second group identifier is used to identify the second group entry, the second group type field is used to indicate load sharing, the second action bucket field includes a fourth sub action bucket, and the fourth sub action bucket carries the first group identifier for instructing to go to the first group entry; and the flow entry includes a match field and an operation instruction field, the match field carries match information of the data flow, and the operation instruction field carries the second group identifier for instructing to go to the second group entry.

With reference to any one of the second aspect, or the second to the fourth possible implementations of the second aspect, in a fifth possible implementation of the second aspect, after the receiving, by the forwarding device, a flow entry and a first group entry from the control device, the method further includes:

after receiving a packet of the data flow from another forwarding device, searching, by the forwarding device, the flow table by using identifier information of the data flow, after the flow entry is matched, performing an action of going to the first group table corresponding to the first group identifier, and after the packet goes to the first group table, forwarding the packet on the first path or the second path in load sharing mode according to indications of the first sub action bucket and the second sub action bucket;

setting, by the forwarding device, a forwarding state of the first sub action bucket to inactive and a forwarding state of the third sub action bucket to active when the forwarding device detects that the first path fails, so as to update the first group table; and correspondingly, forwarding, by the forwarding device, the packet on the third path or the second path in load sharing mode.

With reference to the fifth possible implementation of the second aspect, in a sixth possible implementation of the second aspect, after the setting, by the forwarding device, a forwarding state of the first sub action bucket to inactive and a forwarding state of the third sub action bucket to active when the forwarding device detects that the first path fails, so as to update the first group table, the method further includes:

sending, by the forwarding device, a first notification message to the control device, where the first notification message indicates that the first path fails;

receiving, by the forwarding device, an updated first group entry from the control device, where the updated first group entry indicates that the forwarding state of the first sub action bucket is inactive, and indicates that the forwarding state of the third sub action bucket is active; and updating, by the forwarding device, the first group table according to the updated first group entry.

With reference to the sixth possible implementation of the second aspect, in a seventh possible implementation of the second aspect, the method further includes:

when the forwarding device detects that the first path recovers from the failure, setting, by the forwarding device, the forwarding state of the first sub action bucket to active and the forwarding state of the third sub action bucket to inactive; and correspondingly, forwarding, by the forwarding device, the packet on the first path in load sharing mode.

With reference to any one of the second aspect, or the second to the fourth possible implementations of the second aspect, in an eighth possible implementation of the second aspect, after the creating, by the forwarding device, a flow table according to the flow entry, and creating a first group table according to the first group entry, the method further includes:

after receiving a packet of the data flow from another forwarding device, searching, by the forwarding device, the flow table by using identifier information of the data flow, after the flow entry is matched, performing an action of going to the first group table corresponding to the first group identifier, and after the packet goes to the first group table, forwarding the packet on the first path or the second path in load sharing mode according to indications of the first sub action bucket and the second sub action bucket;

setting, by the forwarding device, the first path corresponding to the first sub action bucket to a path used for rerouting, a forwarding state of the first sub action bucket to inactive, the third path corresponding to the third sub action bucket to a path used for load sharing, and a forwarding state of the third sub action bucket to active when the forwarding device detects that the first path fails, so as to update the first group table; and correspondingly, forwarding, by the forwarding device, the packet on the third path or the second path in load sharing mode.

With reference to the eighth possible implementation of the second aspect, in a ninth possible implementation of the second aspect, after the setting, by the forwarding device, the first path corresponding to the first sub action bucket to a path used for rerouting, a forwarding state of the first sub action bucket to inactive, the third path corresponding to the third sub action bucket to a path used for load sharing, and a forwarding state of the third sub action bucket to active when the forwarding device detects that the first path fails, so as to update the first group table, the method further includes:

sending, by the forwarding device, a first notification message to the control device, where the first notification message indicates that the first path fails;

receiving, by the forwarding device, an updated first group entry from the control device, where the updated first group entry indicates that the first path corresponding to the first sub action bucket is used for rerouting and that the forwarding state of the first sub action bucket is inactive, and indicates that the third path corresponding to the third sub action bucket is used for load sharing and that the forwarding state of the third sub action bucket is active; and updating, by the forwarding device, the first group table according to the updated first group entry.

According to a third aspect, the application provides a control device, applied to a network in which control is separated from forwarding, where the network in which control is separated from forwarding includes the control device and a forwarding device, the control device controls the forwarding device, and the control device includes:

a processing module, configured to determine at least three paths for a data flow, and generate a first group entry and a flow entry for the data flow, where the at least three paths are paths for transmitting the data flow from the forwarding device to a destination forwarding device; and a sending module, configured to send the flow entry and the first group entry to the forwarding device, where the flow entry is used to instruct the forwarding device to perform an operation of going to the first group entry when the data flow is matched, and the first group entry is used to instruct the forwarding device to set a first path and a second path in the at least three paths as load-sharing paths and set a third path in the at least three paths as a reroute protection path for the first path and the second path.

With reference to the third aspect, in a first possible implementation of the third aspect, the first group entry includes a first group type field and a first action bucket field, the first group type field is used to indicate that a current group is a scenario including the load-sharing paths and the reroute protection path, and the first action bucket field is used to indicate that the first path and the second path are load-sharing paths for the data flow and that forwarding states of the first path and the second path are both active, and used to indicate that the third path is a rerouting path when the load-sharing path fails and that a forwarding state of the third path is inactive.

With reference to the first possible implementation of the third aspect, in a second possible implementation of the third aspect, the first action bucket field includes a first sub action bucket, a second sub action bucket, and a third sub action bucket, the first sub action bucket indicates that the first path is a load-sharing path for the data flow and that the forwarding state of the first path is active, the second sub action bucket indicates that the second path is a load-sharing path for the data flow and that the forwarding state of the second path is active, and the third sub action bucket indicates that the third path is a rerouting path when the load-sharing path fails and that the forwarding state of the third path is inactive.

With reference to the third aspect, or the first or the second possible implementation of the third aspect, in a third possible implementation of the first aspect, the first group entry further includes a first group identifier; and that the flow entry is used to instruct the forwarding device to perform an operation of going to the first group entry when the data flow is matched includes:

the flow entry includes a match field and an operation instruction field, the match field carries match information of the data flow, and the operation instruction field carries the first group identifier for instructing to go to the first group entry.

With reference to the third aspect, or the first or the second possible implementation of the third aspect, in a fourth possible implementation of the first aspect, the processing module is further configured to:

generate a second group entry for the data flow, where the second group entry includes a second group identifier, a second group type field, and a second action bucket field, the second group identifier is used to identify the second group entry, the second group type field is used to indicate load sharing, the second action bucket field includes a fourth sub action bucket, and the fourth sub action bucket carries the first group identifier for instructing to go to the first group entry; and that the flow entry is used to instruct the forwarding device to perform an operation of going to the first group entry when the data flow is matched includes:

the flow entry includes a match field and an operation instruction field, the match field carries match information of the data flow, and the operation instruction field carries the second group identifier for instructing to go to the second group entry.

With reference to any one of the second to the fourth possible implementations of the third aspect, in a fifth possible implementation of the third aspect, after the sending module sends the flow entry and the first group entry to the forwarding device, the receiving module is further configured to:

receive a first notification message from the forwarding device, where the first notification message indicates that the first path fails;

the processing module is further configured to set, according to the first notification message received by the receiving module, a forwarding state of the first sub action bucket to inactive and a forwarding state of the third sub action bucket to active; and the sending module is further configured to send the first group entry updated by the processing module to the forwarding device.

With reference to the fifth possible implementation of the third aspect, in a sixth possible implementation of the third aspect, after the sending module sends the updated first group entry to the forwarding device, the receiving module is further configured to:

receive a second notification message from the forwarding device, where the second notification message indicates that the first path recovers from the failure;

the processing module is further configured to set, according to the second notification message received by the receiving module, the forwarding state of the first sub action bucket to active and the forwarding state of the third sub action bucket to inactive; and the sending module is further configured to send the first group entry updated again by the processing module to the forwarding device.

With reference to any one of the second to the fourth possible implementations of the third aspect, in a seventh possible implementation of the third aspect, after the sending module sends the flow entry and the first group entry to the forwarding device, the receiving module is further configured to:

receive a third notification message from the forwarding device, where the third notification message indicates that the first path fails;

the processing module is further configured to set, according to the third notification message received by the receiving module, the first path corresponding to the first sub action bucket to a path used for rerouting, a forwarding state of the first sub action bucket to inactive, the third path corresponding to the third sub action bucket to a path used for load sharing, and a forwarding state of the third sub action bucket to active; and the sending module is further configured to send the first group entry updated by the processing module to the forwarding device.

According to a fourth aspect, the application provides a forwarding device, applied to a network in which control is separated from forwarding, where the network in which control is separated from forwarding includes a control device and the forwarding device, the control device controls the forwarding device, and the forwarding device includes:

a receiving module, configured to receive a flow entry and a first group entry from the control device, where the flow entry is used to instruct the forwarding device to perform an operation of going to the first group entry when the data flow is matched, the first group entry is used to instruct the forwarding device to set a first path and a second path in at least three paths computed by the control device for the data flow as load-sharing paths and set a third path in the at least three paths as a reroute protection path for the first path and the second path, and the at least three paths are paths for transmitting the data flow from the forwarding device to a destination forwarding device; and a processing module, configured to: create a flow table according to the flow entry, and create a first group table according to the first group entry.

With reference to the fourth aspect, in a first possible implementation of the fourth aspect, the first group entry includes a first group type field and a first action bucket field, the first group type field is used to indicate that a current group is a scenario including the load-sharing paths and the reroute protection path, and the first action bucket field is used to indicate that the first path and the second path are load-sharing paths for the data flow and that forwarding states of the first path and the second path are both active, and used to indicate that the third path is a rerouting path when the load-sharing path fails and that a forwarding state of the third path is inactive.

With reference to the first possible implementation of the fourth aspect, in a second possible implementation of the fourth aspect, the first action bucket field includes a first sub action bucket, a second sub action bucket, and a third sub action bucket, the first sub action bucket indicates that the first path is a load-sharing path for the data flow and that the forwarding state of the first path is active, the second sub action bucket indicates that the second path is a load-sharing path for the data flow and that the forwarding state of the second path is active, and the third sub action bucket indicates that the third path is a rerouting path when the load-sharing path fails and that the forwarding state of the third path is inactive.

With reference to the fourth aspect, or the first or the second possible implementation of the fourth aspect, in a third possible implementation of the second aspect of the application, the first group entry further includes a first group identifier; and that the flow entry is used to instruct the forwarding device to perform an operation of going to the first group entry when the data flow is matched includes:

the flow entry includes a match field and an operation instruction field, the match field carries match information of the data flow, and the operation instruction field carries the first group identifier for instructing to go to the first group entry.

With reference to the fourth aspect, or the first or the second possible implementation of the fourth aspect, in a fourth possible implementation of the fourth aspect, the receiving module is further configured to:

receive a second group entry from the control device;

the processing module is further configured to create a second group table according to the second group entry received by the receiving module, where the second group entry includes a second group identifier, a second group type field, and a second action bucket field, the second group identifier is used to identify the second group entry, the second group type field is used to indicate load sharing, the second action bucket field includes a fourth sub action bucket, and the fourth sub action bucket carries the first group identifier for instructing to go to the first group entry; and that the flow entry is used to instruct the forwarding device to perform an operation of going to the first group entry when the data flow is matched includes:

the flow entry includes a match field and an operation instruction field, the match field carries match information of the data flow, and the operation instruction field carries the second group identifier for instructing to go to the second group entry.

With reference to any one of the second to the fourth possible implementations of the fourth aspect, in a fifth possible implementation of the fourth aspect, after the forwarding device receives the flow entry and the first group entry from the control device, the processing module is further configured to:

after the receiving module receives a packet of the data flow from another forwarding device, search the flow table by using identifier information of the data flow, after the flow entry is matched, perform an action of going to the first group table corresponding to the first group identifier, and after the packet goes to the first group table, forward the packet on the first path or the second path in load sharing mode according to indications of the first sub action bucket and the second sub action bucket; and when detecting that the first path fails, set a forwarding state of the first sub action bucket to inactive and a forwarding state of the third sub action bucket to active, so as to update the first group table; and correspondingly, the processing module forwards the packet on the third path or the second path in load sharing mode.

With reference to the fifth possible implementation of the fourth aspect, in a sixth possible implementation of the fourth aspect, the forwarding device further includes a sending module, where the sending module is further configured to:

after the processing module sets the forwarding state of the first sub action bucket to inactive and the forwarding state of the third sub action bucket to active, send a first notification message to the control device, where the first notification message indicates that the first path fails;

the receiving module is further configured to receive an updated first group entry from the control device, where the updated first group entry indicates that the forwarding state of the first sub action bucket is inactive, and indicates that the forwarding state of the third sub action bucket is active; and the processing module is further configured to update the first group table according to the updated first group entry received by the receiving module.

With reference to the sixth possible implementation of the fourth aspect, in a seventh possible implementation of the fourth aspect, the processing module is further configured to:

when detecting that the first path recovers from the failure, set the forwarding state of the first sub action bucket to active and the forwarding state of the third sub action bucket to inactive; and correspondingly, the processing module forwards the packet on the first path in load sharing mode.

With reference to any one of the second to the fourth possible implementations of the fourth aspect, in an eighth possible implementation of the fourth aspect, after the processing module creates the flow table according to the flow entry, and creates the first group table according to the first group entry, the processing module is further configured to:

after the receiving module receives a packet of the data flow from another forwarding device, search the flow table by using identifier information of the data flow, after the flow entry is matched, perform an action of going to the first group table corresponding to the first group identifier, and after the packet goes to the first group table, forward the packet on the first path or the second path in load sharing mode according to indications of the first sub action bucket and the second sub action bucket; and when detecting that the first path fails, set the first path corresponding to the first sub action bucket to a path used for rerouting, a forwarding state of the first sub action bucket to inactive, the third path corresponding to the third sub action bucket to a path used for load sharing, and a forwarding state of the third sub action bucket to active, so as to update the first group table; and correspondingly, the processing module forwards the packet on the third path or the second path in load sharing mode.

With reference to the eighth possible implementation of the fourth aspect, in a ninth possible implementation of the fourth aspect, the sending module is further configured to:

send a first notification message to the control device, where the first notification message indicates that the first path fails;

the receiving module is further configured to receive an updated first group entry from the control device, where the updated first group entry indicates that the first path corresponding to the first sub action bucket is used for rerouting and that the forwarding state of the first sub action bucket is inactive, and indicates that the third path corresponding to the third sub action bucket is used for load sharing and that the forwarding state of the third sub action bucket is active; and the processing module is further configured to update the first group table according to the updated first group entry received by the receiving module.

According to a fifth aspect, the application provides a communications system, where the communications system includes:

the control device according to any one of the third aspect, or the first to the seventh possible implementations of the third aspect; and the forwarding device according to any one of the fourth aspect, or the first to the ninth possible implementations of the fourth aspect.

As can be learned from the foregoing technical solutions, the first path and the second path in charge of load sharing are configured for the data flow; the third path in charge of reroute protection is configured; the first group entry for instructing the forwarding device to use the first path and the second path as load-sharing paths and use the third path to perform reroute protection on the first path and the second path is generated; and the flow entry for instructing to perform the operation of going to the first group entry is generated. The technical solutions can resolve a problem that reroute protection cannot be implemented when there are multiple load-sharing paths in a network and any one of the load-sharing paths fails, effectively reduce a packet loss rate, and improve processing efficiency when a failure occurs, thereby ensuring that packets can be forwarded normally.

BRIEF DESCRIPTION OF DRAWINGS

FIG. 1-1 is a schematic diagram of a scenario with two load-sharing paths and one FRR path according to an embodiment of the application;

FIG. 2-1 is a schematic structural diagram of a first group entry according to an embodiment of the application;

FIG. 2-2 is a schematic structural diagram of a second group entry according to an embodiment of the application;

FIG. 2-3 is a schematic structural diagram of a concatenation relationship between a first group entry and a second group entry according to an embodiment of the application;

FIG. 3 is a flowchart for forwarding a packet in a forwarding device according to an embodiment of the application;

FIG. 4 is a flowchart for forwarding a packet in a forwarding device according to an embodiment of the application;

FIG. 5 is a schematic diagram of another embodiment of a routing method according to an embodiment of the application;

FIG. 6-1 is a schematic structural diagram of a control device according to an embodiment of the application;

FIG. 6-2 is another schematic structural diagram of a control device according to an embodiment of the application;

FIG. 7-1 is a schematic structural diagram of a forwarding device according to an embodiment of the application;

FIG. 7-2 is another schematic structural diagram of a forwarding device according to an embodiment of the application;

DESCRIPTION OF EMBODIMENTS

Figure 1:
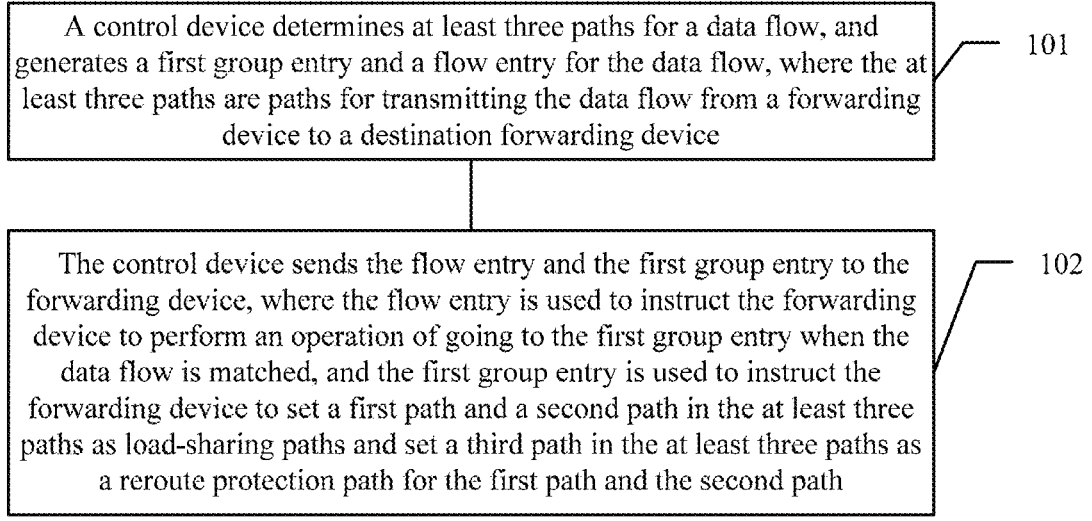
FIG. 1 is a schematic diagram of an embodiment of a routing method according to an embodiment of the application.
Figure 1:
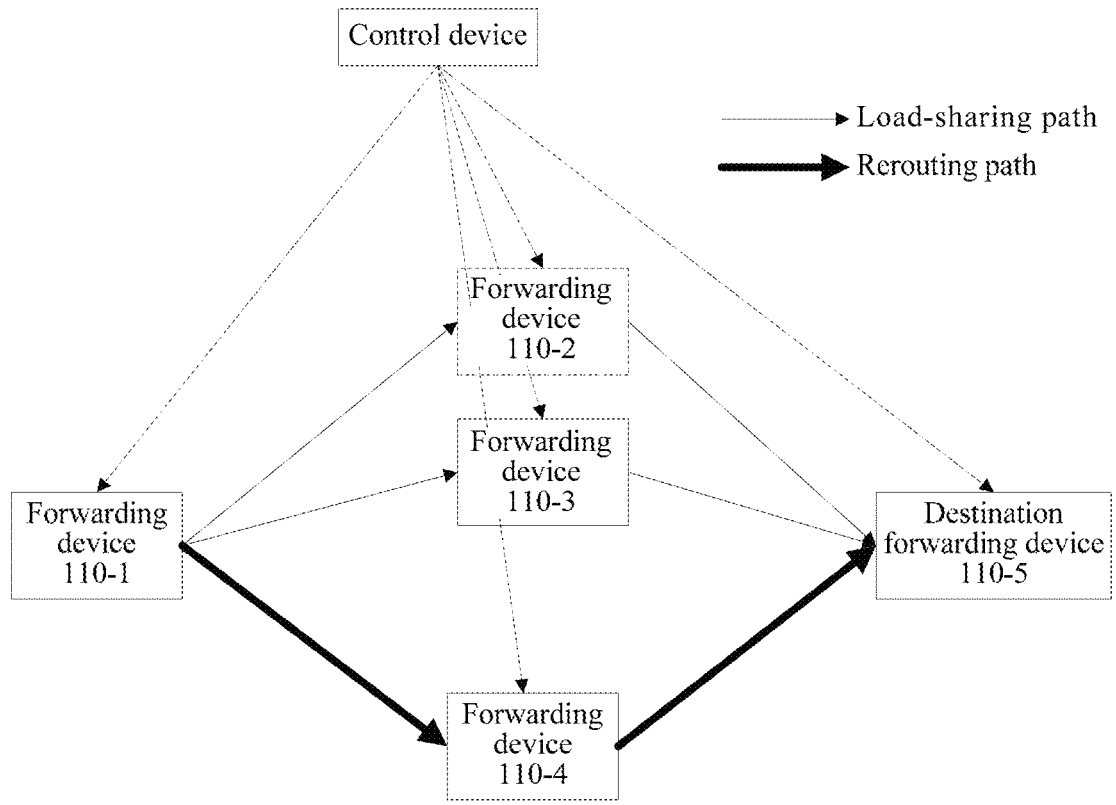

To make a person skilled in the art understand the technical solutions in the application better, the following clearly describes the technical solutions in the embodiments of the application with reference to the accompanying drawings in the embodiments of the application. Apparently, the described embodiments are merely some rather than all of the embodiments of the application. All other embodiments obtained by a person skilled in the art based on the embodiments of the application without creative efforts shall fall within the protection scope of the application.

In the specification, claims, and accompanying drawings of the application, the terms "first", "second", "third", "fourth", and so on are intended to distinguish between similar objects but do not necessarily indicate a specific order or sequence. It should be understood that the data termed in such a way are interchangeable in proper circumstances so that the embodiments of the application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

The application provides a routing method, a related device, and a system, mainly applied to a network in which control is separated from forwarding, to resolve a problem that reroute protection cannot be implemented when there are multiple load-sharing paths in a network and any one of the load-sharing paths fails.

A fast reroute (FRR, Fast Re-Route) technology is a limited label forwarding path protection mechanism capable of reducing a data loss when a network failure occurs. Usually, a local backup path is established to reduce impact of a path failure on a label forwarding path, that is, when a failure of a service path is detected, switching from the service path to the backup path is performed, and the backup path is used to bypass the failed service path to reduce a loss of data traffic and implement protection. In addition, to implement load sharing, in a network environment in which there are multiple different paths to a same destination address, equal-cost multi-path routing (ECMP, Equal-Cost-MultipathRouting) is set, so as to implement load sharing for service traffic on the multiple paths when costs are equal; or non-equal-cost multi-path routing is set, so as to implement load sharing for service traffic on the multiple paths when costs are unequal.

In an SDN system based on the OpenFlow protocol, usually, a protection mechanism including service paths and an FRR path needs to be established, that is, an FRR path is configured for at least two load-sharing service paths. In an IP packet forwarding process, a packet is matched with a flow table; after the flow table is matched, a forwarding process is performed according to an instruction or an operation type in the flow table; after the packet enters a forwarding device, first, an ingress port ingress port table is searched, and then a next flow table is searched; and when detecting that any one of the at least two load-sharing service paths fails, the forwarding device sets a group type Group-Type to fast reroute protection for the at least two load-sharing service paths, so as to switch from the failed service path to the corresponding FRR path and implement protection.

It should be noted that, the method in the application may be applied to a reroute protection mechanism in which a ratio of load-sharing paths to FRR paths is n:m, that is, a quantity n of load-sharing paths is greater than or equal to 2, and a quantity m of FRR paths is greater than or equal to 1. This indicates that at least one FRR path may be configured for n load-sharing paths to perform protection. Specific quantities are not limited. In addition, when there are a relatively large quantity of load-sharing paths, protection may be performed in batches. For example, if there are 96 load-sharing paths and 4 FRR paths in total, every 24 load-sharing paths may be grouped into one group, one FRR path is configured for the group to perform reroute protection, and forwarding operations of the groups do not affect each other; or every 48 load-sharing paths may be grouped into one group, two FRR paths are configured for the group to perform reroute protection, and forwarding operations of the groups do not affect each other. A specific quantity allocation mechanism is not limited in this specification.

In addition, the flow table in this specification is defined in the OpenFlow protocol. In a broad sense, a group table may be referred to as a flow table, and a flow table may also include a group table. That is, in this technical field, a group table that implements a group table function may be referred to as a flow table. Any variation about names of the group table and the flow table shall fall within the protection scope of the application.

With reference to FIG. 1, the following describes in detail a routing method according to an embodiment of the application from a control device side. The method is applied to a network in which control is separated from forwarding. The network in which control is separated from forwarding includes a control device and a forwarding device, and the control device controls the forwarding device. This embodiment of the application includes the following steps.

101. The control device determines at least three paths for a data flow, and generates a first group entry and a flow entry for the data flow, where the at least three paths are paths for transmitting the data flow from the forwarding device to a destination forwarding device.

102. The control device sends the flow entry and the first group entry to the forwarding device.

The flow entry is used to instruct the forwarding device to perform an operation of going to the first group entry when the data flow is matched, and the first group entry is used to instruct the forwarding device to set a first path and a second path in the at least three paths as load-sharing paths and set a third path in the at least three paths as a reroute protection path for the first path and the second path.

The first path, the second path, and the third path are paths for transmitting the data flow from the forwarding device to the destination forwarding device.

In an actual application, a scenario with at least two load-sharing paths and at least one FRR path (namely, N:M) may be implemented. Specific quantities are determined according to an actual service, and are not limited in this specification. Using a scenario with two load-sharing paths and one FRR path in FIG. 1-1 as an example, the control device computes three paths from a forwarding device 110-1 to a destination forwarding device 110-5 for a data flow according to a service requirement of a user. A first load-sharing path is a path from the forwarding device 110-1 to the destination forwarding device 110-5 through a forwarding device 110-2, a second load-sharing path is a path from the forwarding device 110-1 to the destination forwarding device 110-5 through a forwarding device 110-3, and the FRR path is a path from the forwarding device 110-1 to the destination forwarding device 110-5 through a forwarding device 110-4.

The control device delivers a flow entry and a first group entry to the forwarding device 110-1. It may be understood that, when a packet arrives at the destination forwarding device 110-5, the control device delivers a corresponding flow entry and group entry to the destination forwarding device 110-5, that is, the forwarding device 110-1 may be any forwarding device in an SDN network.

In a packet forwarding process, after the packet matches the flow entry, the packet goes to the first group entry; and the forwarding device forwards the packet according to an indication of the first group entry, and when determining that the first path or the second path fails, switches from the packet forwarding path to the third path to forward the packet.

Figures 1, 2:
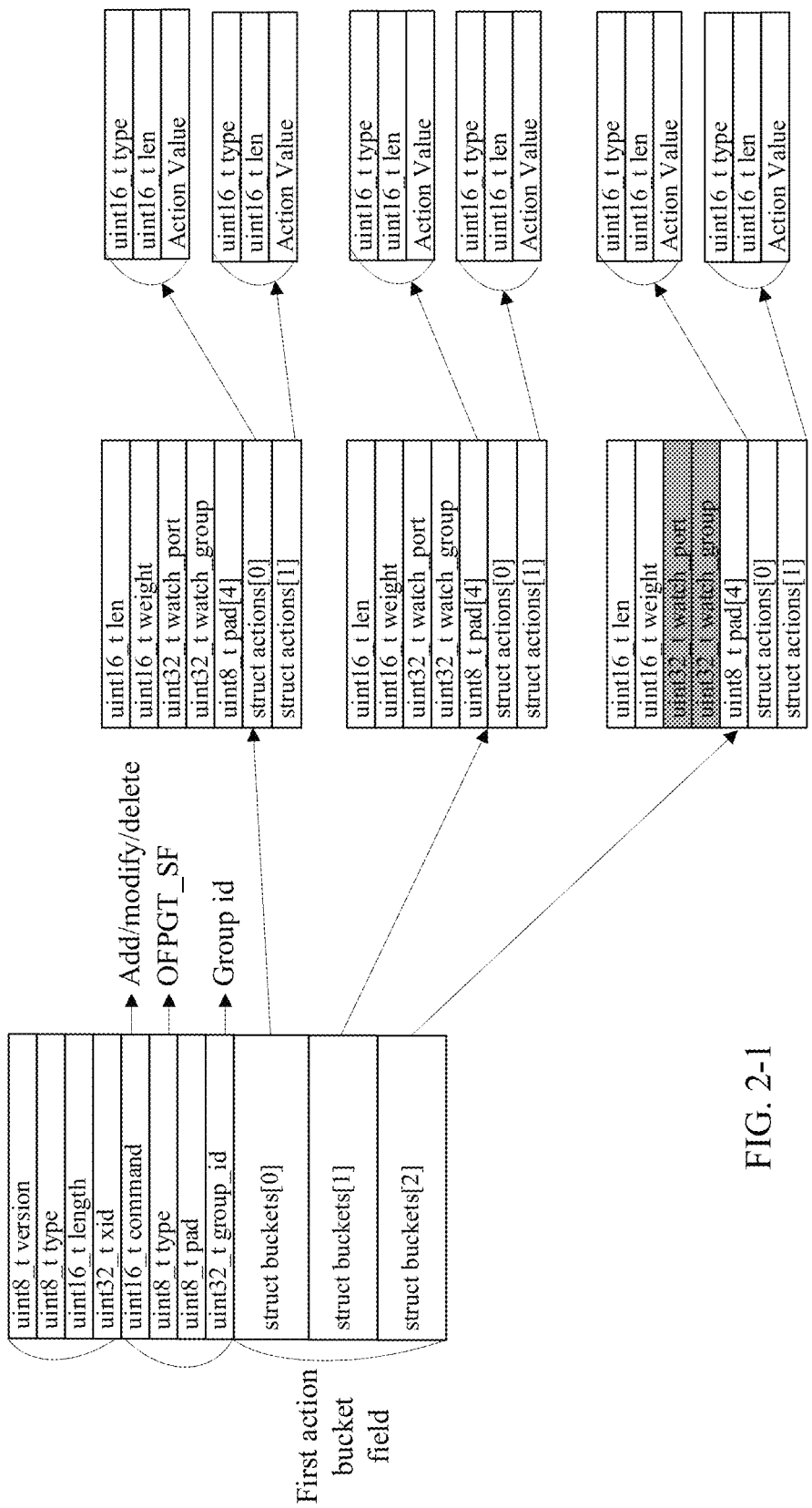
Figure 2:
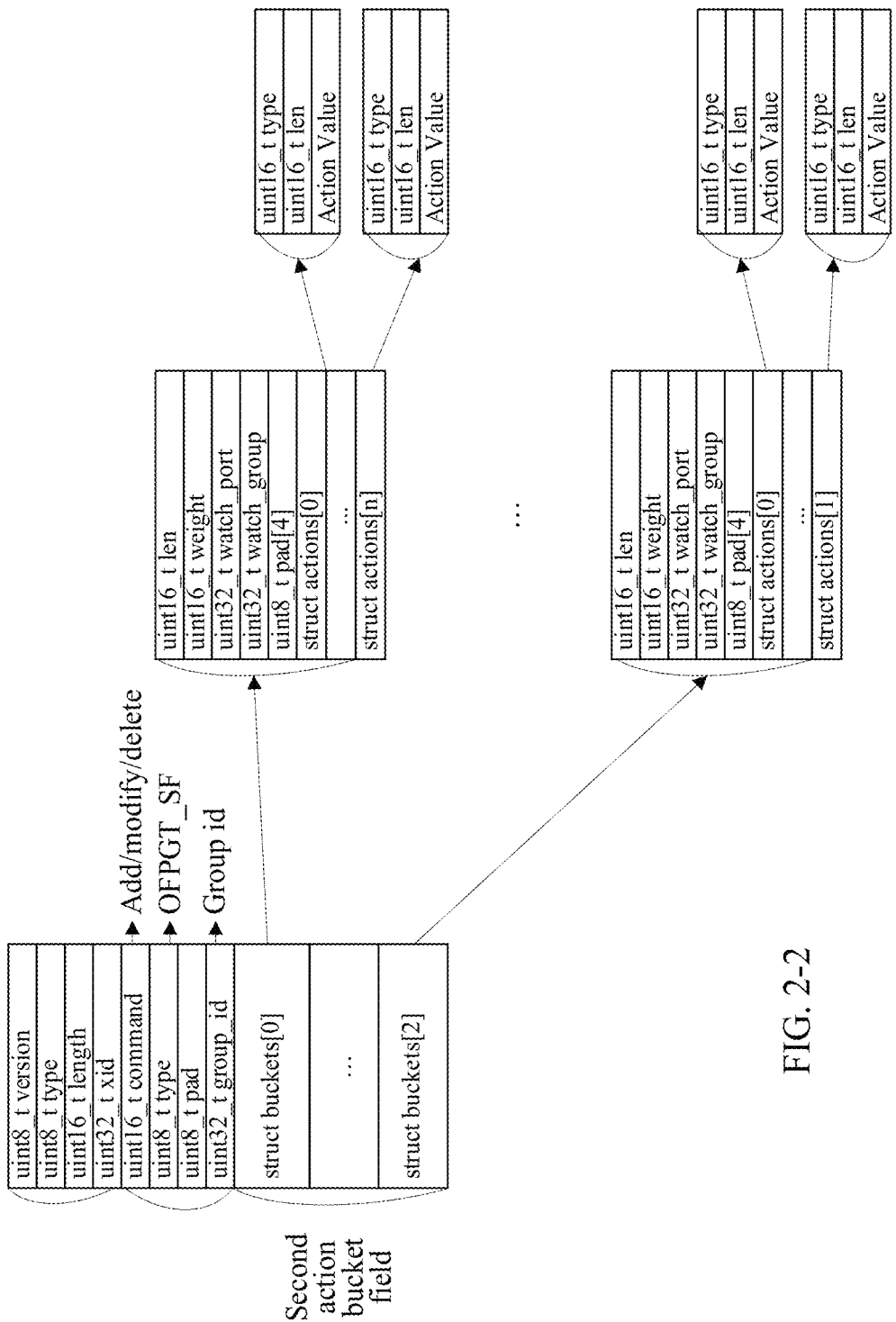
Figures 2, 3:
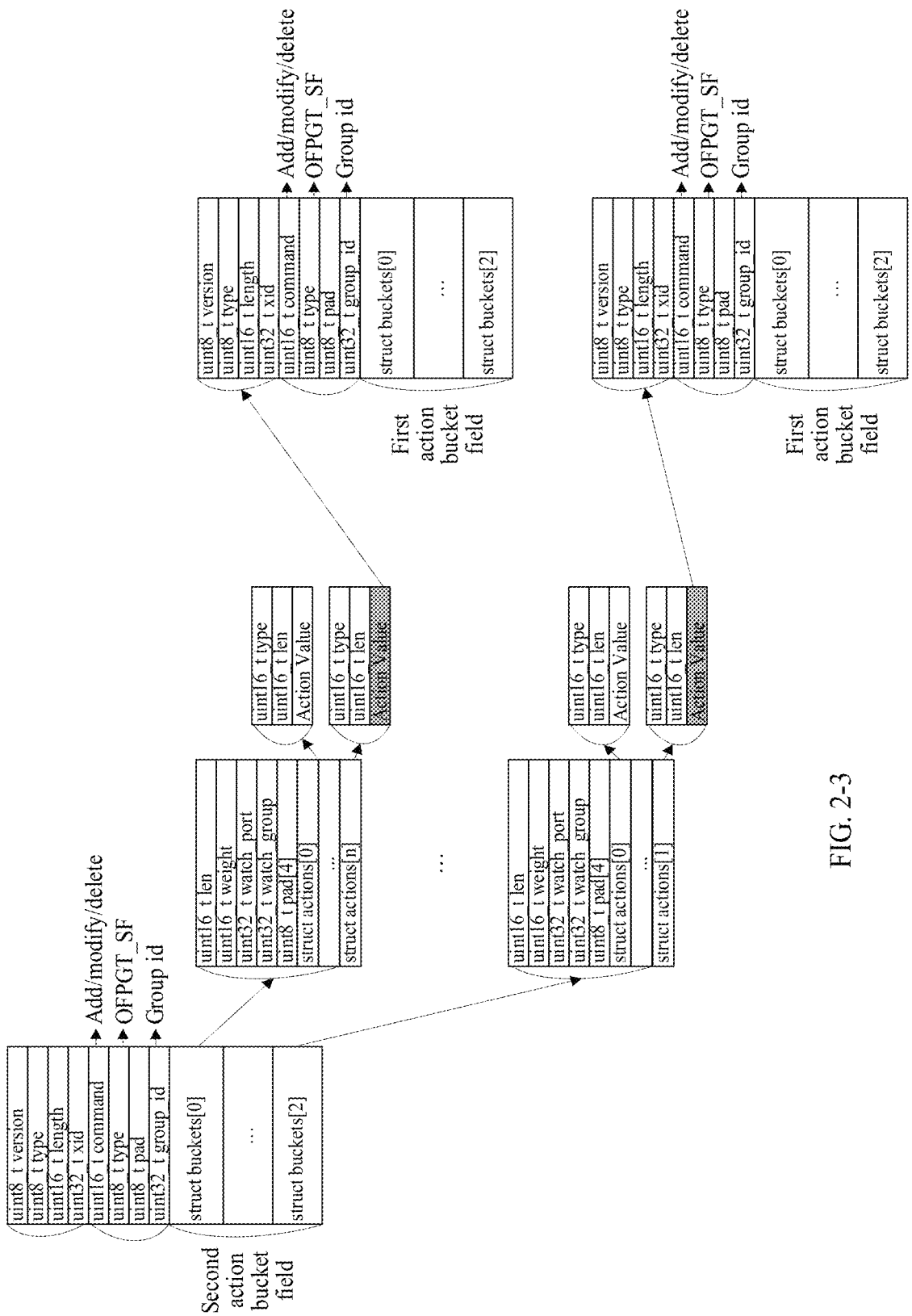

For a specific forwarding operation after the packet enters a port of the forwarding device, refer to a method embodiment of a forwarding device side corresponding to FIG. 3. Details are not further described herein.

In this embodiment of the application, the first path and the second path in charge of load sharing are configured for the data flow; the third path in charge of reroute protection is configured; the first group entry for instructing the forwarding device to use the first path and the second path as load-sharing paths and use the third path to perform reroute protection on the first path and the second path is generated; and the flow entry for instructing to perform the operation of going to the first group entry is generated. This embodiment can resolve a problem that reroute protection cannot be implemented when there are multiple load-sharing paths in a network and any one of the load-sharing paths fails, effectively reduce a packet loss rate, and improve processing efficiency when a failure occurs, thereby ensuring that packets can be forwarded normally.

Optionally, on a basis of the embodiment corresponding to FIG. 1, in a first optional embodiment of this embodiment of the application, referring to a schematic structural diagram of the first group entry shown in FIG. 2-1, the first group entry includes a first group type field and a first action bucket field, the first group type field is used to indicate that a current group is a scenario including the load-sharing paths and the reroute protection path, and the first action bucket field is used to indicate that the first path and the second path are load-sharing paths for the data flow and that forwarding states of the first path and the second path are both active, and used to indicate that the third path is a rerouting path when the load-sharing path fails and that a forwarding state of the third path is inactive.

In an actual application, the first group type field may be an OpenFlow protocol group type-select fast reroute (OF-PGT-SF, OpenFlow Protocol Grouptype-Select Fast failover group) field in the OpenFlow protocol flow entry.

In this optional embodiment, when the first path or the second path fails, the third path may be quickly used according to an indication of a second action bucket field to forward a packet. This can improve network reliability and data continuity.

Optionally, on a basis of the first optional embodiment, in a second optional embodiment of this embodiment of the application, referring to FIG. 2-1, the first action bucket field includes a first sub action bucket, a second sub action bucket, and a third sub action bucket, the first sub action bucket indicates that the first path is a load-sharing path for the data flow and that the forwarding state of the first path is active, the second sub action bucket indicates that the second path is a load-sharing path for the data flow and that the forwarding state of the second path is active, and the third sub action bucket indicates that the third path is a rerouting path when the load-sharing path fails and that the forwarding state of the third path is inactive.

The third sub action bucket corresponds to an end position of the first action bucket field.

For example, when the first path fails, the first sub action bucket corresponding to the first path is inactive, and the third sub action bucket is active.

The following describes a structure of the first action bucket field, as shown in FIG. 2-1.

As can be known, the first action bucket field includes struct buckets[0], struct buckets[1], and struct buckets[2]. Struct buckets[0] and struct buckets[1] form a load-sharing path group (that is, corresponding to the first path and the second path). Struct buckets[2] is a backup bucket for struct buckets[0] and struct buckets[1], that is, reroute protection is formed for the two load-sharing paths. In the OpenFlow protocol, each struct bucket is associated with one port or port group, and an active state of the port or port group may be identified by using a watch port/group. For a group of an OFPGT-SF type, when a struct bucket is selected for performing a forwarding operation, a first active struct bucket is selected and executed according to a sequence (0, 1, 2, . . . , n) of each struct bucket defined in the first group entry. Content mentioned in this optional embodiment is not further described subsequently in this specification.

When there are many service requirements and more load-sharing paths need to be configured, a quantity of struct buckets also increases, and is not limited to the content shown in FIG. 2-1.

When a load-sharing path fails, a sub action bucket corresponding to the failed path in the load-sharing path group becomes inactive, so as to indicate that a current forwarding operation is not performed on the failed path, where a watch port/group in the sub action bucket changes from active to inactive; correspondingly, a forwarding state of the third sub action bucket corresponding to the backup bucket changes from inactive to active, that is, a watch port/group in the third sub action bucket changes from inactive to active, so that the third path is used to forward the packet. This can improve network reliability and data continuity.

Optionally, on a basis of any one of the embodiment corresponding to FIG. 1, or the first or the second optional embodiment, in a third optional embodiment of this embodiment of the application, the first group entry further includes a first group identifier; and that the flow entry is used to instruct the forwarding device to perform an operation of going to the first group entry when the data flow is matched includes:

the flow entry includes a match field and an operation instruction field, the match field carries match information of the data flow, and the operation instruction field carries the first group identifier for instructing to go to the first group entry.

A relationship between the first group entry and the flow entry is configured, so that a packet of the data flow can be sent to the first group entry by using the flow entry. For details, refer to a flowchart for forwarding a packet in a forwarding device as shown in FIG. 3. According to this optional embodiment, in a network environment in which a data service requirement is not high and a network architecture is not complex, an objective of reducing a packet loss rate and improving network stability can be achieved.

Optionally, on a basis of any one of the embodiment corresponding to FIG. 1, or the first to the second optional embodiments, referring to the second group entry shown in FIG. 2-2, in a fourth optional embodiment of this embodiment of the application, the method further includes:

the control device generates a second group entry for the data flow, where the second group entry includes a second group identifier, a second group type field, and a second action bucket field, the second group identifier group ID is used to identify the second group entry, the second group type field is used to indicate load sharing, the second action bucket field includes a fourth sub action bucket, and the fourth sub action bucket carries the first group identifier for instructing to go to the first group entry, where when the packet goes from the second group entry to the first group entry, a structure of a concatenation relationship between the first group entry and the second group entry shown in FIG. 2-3 may be used for an implementation; and that the flow entry is used to instruct the forwarding device to perform an operation of going to the first group entry when the data flow is matched includes:

the flow entry includes a match field and an operation instruction field, the match field carries match information of the data flow, and the operation instruction field carries the second group identifier for instructing to go to the second group entry, as shown in a flowchart for forwarding a packet in a forwarding device in FIG. 4.

It may be understood that, in the third or the fourth optional embodiment, after the first group entry and the flow entry are delivered to the forwarding device, the forwarding device may create a flow table by using the flow entry, create a first group table by using the first group entry, and create a second group table by using the second group entry. Because the control device has configured a relationship between the flow entry and the first group entry, or has configured a relationship between the flow entry, the first group entry, and the second group entry, a correspondence also exists between the flow table, the first group table, and the second group table.

Therefore, after the packet enters the forwarding device, the packet is matched with the flow table, and a last matched flow entry may instruct the packet to directly go to the first group entry (as shown in FIG. 3), or may instruct the packet to first go to the second group entry and finally go to the first group entry (as shown in FIG. 4).

The flow table may be a single flow table, or may be a multi-level flow table, for example, Table0, Table1, . . . , TableN. In a forwarding process of the multi-level flow table, pipeline matching is performed with the packet according to a sequence of 0, 1, . . . , N.

Likewise, the first group table and the second group table may be single group tables, or may be a multi-level group table, for example, GroupTable0, GroupTable1, . . . , GroupTableN. In a forwarding process of the multi-level group table, pipeline matching is performed with the packet according to a sequence of 0, 1, . . . , N.

In addition, the second group entry and the first group entry may form a multi-level group table (as shown in FIG. 2-3), and the first group entry is a next group entry for the second group entry. Specifically, quantities of first group entries and second group entries are determined according to a quantity of load-sharing paths required in an actual application or according to a scheduling algorithm. For example, when there are a large quantity of load-sharing paths, after the flow entry is matched, the corresponding first group entry needs to be selected according to the second group entry. Division of work is definite. This effectively improves forwarding processing efficiency and optimizes a forwarding mechanism.

In addition, the second group entry only indicates load sharing, but the first group entry may be used for reroute protection in a subsequent forwarding process. In this optional embodiment, the multi-level group table formed by the first group table and the second group table further ensures normal forwarding of the packet, and the packet first goes to the second group entry. Therefore, hierarchical processing is implemented, and packet processing efficiency can be improved.

Optionally, on a basis of any one of the second to the fourth optional embodiments, in a fifth optional embodiment of this embodiment of the application, when both the first path and the second path are normal, a forwarding state of the first sub action bucket is active, a forwarding state of the second sub action bucket is active, and a forwarding state of the third sub action bucket is inactive; after the control device sends the flow entry and the first group entry to the forwarding device, the method further includes:

the control device receives a first notification message from the forwarding device, where the first notification message indicates that the first path fails;

the control device sets, according to the first notification message, the forwarding state of the first sub action bucket to inactive and the forwarding state of the third sub action bucket to active; and the control device sends the updated first group entry to the forwarding device.

In this optional embodiment, in a reroute protection mechanism formed by the first to the third paths, when the first path fails, the third path can be immediately used instead to complete forwarding of the data flow. This avoids a problem of service interruption caused by discarding a packet sent to a failed port.

Optionally, on a basis of the fifth optional embodiment, in a sixth optional embodiment of this embodiment of the application, the method further includes:

after the control device sends the updated first group entry to the forwarding device, the method further includes:

the control device receives a second notification message from the forwarding device, where the second notification message indicates that the first path recovers from the failure;

the control device sets, according to the second notification message, the forwarding state of the first sub action bucket to active and the forwarding state of the third sub action bucket to inactive; and the control device sends the first group entry that is updated again to the forwarding device.

In this optional embodiment, the control device may control the forwarding device by using a flow table message, and in the reroute protection mechanism formed by the first to the third paths, when the first path fails, control the forwarding device to use the third path instead to complete forwarding of the data flow. This avoids a problem of service interruption caused by discarding a packet sent to a failed port.

Optionally, on a basis of any one of the second to the fourth optional embodiments, in a seventh optional embodiment of this embodiment of the application, after the control device sends the flow entry and the first group entry to the forwarding device, the method further includes:

the control device receives a third notification message from the forwarding device, where the third notification message indicates that the first path fails;

the control device sets, according to the third notification message, the first path corresponding to the first sub action bucket to a path used for rerouting, a forwarding state of the first sub action bucket to inactive, the third path corresponding to the third sub action bucket to a path used for load sharing, and a forwarding state of the third sub action bucket to active; and the control device sends the updated first group entry to the forwarding device.

In this optional embodiment, when the first path fails, the first path is used as an FRR path, so that after the first path recovers from the failure, reroute protection may be performed on the second path and the third path. This effectively avoids a problem of data transmission interruption generally caused by immediately switching back to the first path after the first path recovers in the prior art.

The following describes a routing method according to an embodiment of the application from a forwarding device side. Referring to FIG. 5, this embodiment of the application is applied to a network in which control is separated from forwarding, where the network in which control is separated from forwarding includes a control device and a forwarding device, the control device controls the forwarding device, and the method includes the following steps.

201. The forwarding device receives a flow entry and a first group entry from the control device.

The flow entry is used to instruct the forwarding device to perform an operation of going to the first group entry when the data flow is matched, and the first group entry is used to instruct the forwarding device to set a first path and a second path in at least three paths computed by the control device for the data flow as load-sharing paths and set a third path in the at least three paths as a reroute protection path for the first path and the second path.

202. The forwarding device creates a flow table according to the flow entry, and creates a first group table according to the first group entry.

In this embodiment of the application, the flow table is configured according to the flow entry delivered by the control device, and the first group table is configured by using the first group entry, so that when the load-sharing first path and second path fail, the third path in charge of reroute protection may be used instead according to the first group table. This embodiment can resolve a problem that reroute protection cannot be implemented when there are multiple load-sharing paths in a network and any one of the load-sharing paths fails, effectively reduce a packet loss rate, and improve processing efficiency when a failure occurs, thereby ensuring that packets can be forwarded normally.

Optionally, on a basis of the embodiment corresponding to FIG. 5, in a first optional embodiment of this embodiment of the application, referring to FIG. 2-1, the first group entry includes a first group type field and a first action bucket field, the first group type field is used to indicate that a current group is a scenario including the load-sharing paths and the reroute protection path, and the first action bucket field is used to indicate that the first path and the second path are load-sharing paths for the data flow and that forwarding states of the first path and the second path are active, and used to indicate that the third path is a rerouting path when the load-sharing path fails and that a forwarding state of the third path is inactive.

In an actual application, the first group type field may be an OpenFlow protocol group type-select fast reroute (OF-PGT-SF, OpenFlow Protocol Grouptype-Select Fast failover group) field in the OpenFlow protocol flow entry.

In this optional embodiment, when the first path or the second path fails, the third path may be quickly used according to an indication of a third sub action bucket to forward a packet. This can improve network reliability and data continuity.

Optionally, on a basis of the first optional embodiment, in a second optional embodiment of this embodiment of the application, the first action bucket field includes a first sub action bucket, a second sub action bucket, and a third sub action bucket, the first sub action bucket indicates that the first path is a load-sharing path for the data flow and that the forwarding state of the first path is active, the second sub action bucket indicates that the second path is a load-sharing path for the data flow and that the forwarding state of the second path is active, and the third sub action bucket indicates that the third path is a rerouting path when the load-sharing path fails and that the forwarding state of the third path is inactive.

Optionally, on a basis of any one of the embodiment corresponding to FIG. 5, or the first to the second optional embodiments, in a third optional embodiment of this embodiment of the application, the first group entry further includes a first group identifier; and that the flow entry is used to instruct the forwarding device to perform an operation of going to the first group entry when the data flow is matched includes:

the flow entry includes a match field and an operation instruction field, the match field carries match information of the data flow, and the operation instruction field carries the first group identifier for instructing to go to the first group entry.

In this optional embodiment, a relationship between the first group entry and the flow entry is configured, so that a packet of the data flow can be sent to the first group entry by using the flow entry. In a network environment in which a data service requirement is not high and a network architecture is not complex, an objective of reducing a packet loss rate and improving network stability can be achieved.

Optionally, on a basis of any one of the embodiment corresponding to FIG. 5, or the first to the second optional embodiments, in a fourth optional embodiment of this embodiment of the application, the method further includes:

the forwarding device receives a second group entry from the control device, and creates a second group table according to the second group entry, where the second group entry includes a second group identifier, a second group type field, and a second action bucket field, the second group identifier is used to identify the second group entry, the second group type field is used to indicate load sharing, the second action bucket field includes a fourth sub action bucket, and the fourth sub action bucket carries the first group identifier for instructing to go to the first group entry; and that the flow entry is used to instruct the forwarding device to perform an operation of going to the first group entry when the data flow is matched includes:

the flow entry includes a match field and an operation instruction field, the match field carries match information of the data flow, and the operation instruction field carries the second group identifier for instructing to go to the second group entry.

When the packet goes from the second group entry to the first group entry, a structure of a concatenation relationship between the first group entry and the second group entry as shown in FIG. 2-3 may be used for an implementation. In this optional embodiment, a multi-level group table formed by the first group table and the second group table further ensures normal forwarding of the packet, and the packet first goes to the second group entry. Hierarchical processing is implemented, and division of work is definite. This effectively improves forwarding processing efficiency, optimizes a forwarding mechanism, and improves packet processing efficiency.

As can be known from the foregoing content, the forwarding device establishes a relationship between the flow table and the first group table, or establishes a relationship between the flow table, the first group table, and the second group table. After the forwarding device receives the packet, the packet is matched with the flow table, and finally goes to the first group table.

In an SDN network, after the forwarding device receives the packet, a packet processing procedure is as follows:

1. After the packet enters the forwarding device through an ingress port, the packet is matched with the flow table according to a match/metadata match field carried in the packet.

The flow table may be a single flow table, or may be a multi-level flow table, namely, Table0, Table1, . . . , TableN. Pipeline matching is performed with the packet according to a sequence of 0, 1, . . . , N. In a pipeline matching process of the multi-level flow table, when a flow table on each level is matched with the packet, an action in the flow table on the level, namely, goto flow table Goto-table, is performed to continue to enter a next-level flow table for processing. In processing of a flow table on a last level, an action of an OpenFlow action group OFPAT GROUP type is performed, where the action means going to the first group table Grouptable1 for forwarding the packet in a next phase, and the action includes the first group identifier group ID of the first group table.

2. The packet goes to the first group table.

The packet goes to the first group table mainly in the following two ways:

A. The packet goes from the flow table to the first group table, and this forwarding operation is completed, as shown in FIG. 3.

After the packet arrives at the first group table, the packet is matched with the first group table. The first group table may be a single group table, or may be a multi-level group table (such as GroupTable0, GroupTable1, . . . , GroupTableN. In a forwarding process of the multi-level group table, pipeline matching is performed with the packet according to a sequence of 0, 1, . . . , N).

B. The packet goes from the flow table to the second group table, and goes from the second group table to the first group table sequentially, and this forwarding operation is completed, as shown in FIG. 4.

The first group table or the second group table may be a single group table, or may be a multi-level group table (such as GroupTable0, GroupTable1, . . . , GroupTableN. In a forwarding process of the multi-level group table, pipeline matching is performed with the packet according to a sequence of 0, 1, . . . , N). A combination of the first group and the second group table may further ensure normal forwarding of the packet, and the packet is first sent to the second group table. Therefore, hierarchical processing is implemented, packet processing efficiency can be improved, the forwarding mechanism is optimized.

A specific quantity of flow tables and a quantity of group tables are determined according to actual load-sharing paths or designs, and are not limited in this specification.

Optionally, on a basis of any one of the second to the fourth optional embodiments, in a fifth optional embodiment of this embodiment of the application, after the forwarding device receives the flow entry and the first group entry from the control device, the method further includes:

after receiving a packet of the data flow from another forwarding device, the forwarding device searches the flow table by using identifier information of the data flow, after the flow entry is matched, performs an action of going to the first group table corresponding to the first group identifier, and after the packet goes to the first group table, forwards the packet on the first path or the second path in load sharing mode according to indications of the first sub action bucket and the second sub action bucket;

the forwarding device sets a forwarding state of the first sub action bucket to inactive and a forwarding state of the third sub action bucket to active when the forwarding device detects that the first path fails, so as to update the first group table; and correspondingly, the forwarding device forwards the packet on the third path or the second path in load sharing mode.

In this optional embodiment, in a reroute protection mechanism formed by the first to the third paths, when the first path or the second path fails, the third path can be immediately used instead to complete forwarding of the data flow. This avoids a problem of service interruption caused by discarding a packet sent to a failed port.

Optionally, on a basis of the fifth optional embodiment, in a sixth optional embodiment of this embodiment of the application, after the forwarding device sets the forwarding state of the first sub action bucket to inactive and the forwarding state of the third sub action bucket to active when the forwarding device detects that the first path fails, so as to update the first group table, the method further includes:

the forwarding device sends a first notification message to the control device, where the first notification message indicates that the first path fails;

the forwarding device receives an updated first group entry from the control device, where the updated first group entry indicates that the forwarding state of the first sub action bucket is inactive, and indicates that the forwarding state of the third sub action bucket is active; and the forwarding device updates the first group table according to the updated first group entry.

The "inactive" is used to indicate that the first path does not participate in the forwarding operation, and the "active" is used to indicate that the third path participates in forwarding.

The forwarding device switches the packet from the first path to the third path. It may be understood that, the failed load-sharing path may be the first path or the second path, or a load-sharing path in any other group. In this specification, the failure of the first path is used only as an example for description. The specific path is not limited in this specification.

In this optional embodiment, in the reroute protection mechanism formed by the first to the third paths, when the first path or the second path fails, the third path can be immediately used instead to complete forwarding of the data flow. This avoids a problem of service interruption caused by discarding a packet sent to a failed port.

Optionally, on a basis of the sixth optional embodiment, in a seventh optional embodiment of this embodiment of the application, the method further includes:

when the forwarding device detects that the first path recovers from the failure, the forwarding device sets the forwarding state of the first sub action bucket to active and the forwarding state of the third sub action bucket to inactive; and correspondingly, the forwarding device forwards the packet on the first path in load sharing mode.

Optionally, on a basis of any one of the second to the fourth optional embodiments, in an eighth optional embodiment of this embodiment of the application, after the forwarding device creates the flow table according to the flow entry, and creates the first group table according to the first group entry, the method further includes:

after receiving a packet of the data flow from another forwarding device, the forwarding device searches the flow table by using identifier information of the data flow, after the flow entry is matched, performs an action of going to the first group table corresponding to the first group identifier, and after the packet goes to the first group table, forwards the packet on the first path or the second path in load sharing mode according to indications of the first sub action bucket and the second sub action bucket;

the forwarding device sets the first path corresponding to the first sub action bucket to a path used for rerouting, a forwarding state of the first sub action bucket to inactive, the third path corresponding to the third sub action bucket to a path used for load sharing, and a forwarding state of the third sub action bucket to active when the forwarding device detects that the first path fails, so as to update the first group table; and correspondingly, the forwarding device forwards the packet on the third path or the second path in load sharing mode.

In this optional embodiment, when the first path fails, the first path is used as an FRR path, so that after the first path recovers from the failure, reroute protection may be performed on the second path and the third path. This effectively avoids a problem of data transmission interruption generally caused by immediately switching back to the first path after the first path recovers in the prior art.

Optionally, on a basis of the eighth optional embodiment, in a ninth optional embodiment of this embodiment of the application, after the forwarding device sets the first path corresponding to the first sub action bucket to a path used for rerouting, the forwarding state of the first sub action bucket to inactive, the third path corresponding to the third sub action bucket to a path used for load sharing, and the forwarding state of the third sub action bucket to active when the forwarding device detects that the first path fails, so as to update the first group table, the method further includes:

the forwarding device sends a first notification message to the control device, where the first notification message indicates that the first path fails;

the forwarding device receives an updated first group entry from the control device, where the updated first group entry indicates that the first path corresponding to the first sub action bucket is used for rerouting and that the forwarding state of the first sub action bucket is inactive, and indicates that the third path corresponding to the third sub action bucket is used for load sharing and that the forwarding state of the third sub action bucket is active; and the forwarding device updates the first group table according to the updated first group entry.

In this optional embodiment, when the first path fails, the first path is used as an FRR path according to the updated first group entry, so that after the first path recovers from the failure, reroute protection may be performed on the second path and the third path. This effectively avoids a problem of data transmission interruption generally caused by immediately switching back to the first path after the first path recovers in the prior art.

Figures 1, 6:
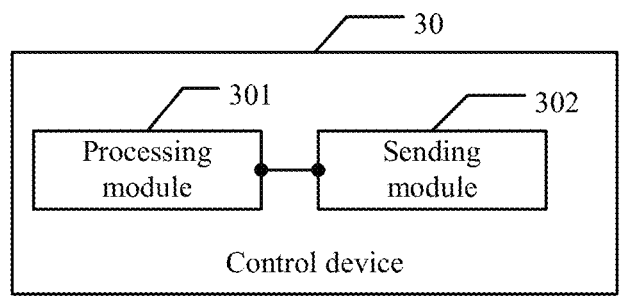
Figures 2, 6:
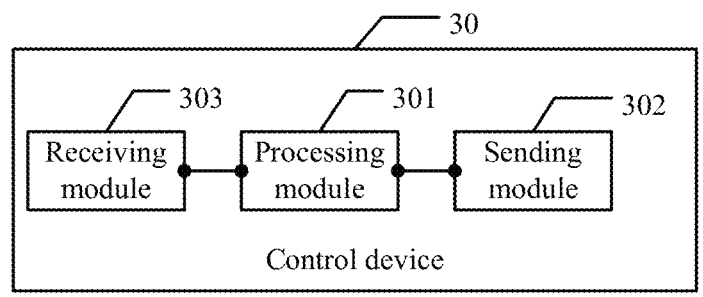

The following describes in detail a control device according to the application from a perspective of a device. The control device 30 is applied to a network in which control is separated from forwarding, where the network in which control is separated from forwarding includes the control device and a forwarding device, and the control device 30 controls the forwarding device. Referring to FIG. 6-1, the control device 30 includes:

a processing module 301, configured to determine at least three paths for a data flow, and generate a first group entry and a flow entry for the data flow, where the at least three paths are paths for transmitting the data flow from the forwarding device to a destination forwarding device; and a sending module 302, configured to send the flow entry and the first group entry to the forwarding device, where the flow entry is used to instruct the forwarding device to perform an operation of going to the first group entry when the data flow is matched, and the first group entry is used to instruct the forwarding device to set a first path and a second path in the at least three paths as load-sharing paths and set a third path in the at least three paths as a reroute protection path for the first path and the second path.

In this embodiment of the application, the processing module 301 configures the first path and the second path in charge of load sharing for the data flow, configures the third path in charge of reroute protection, generates the first group entry for instructing the forwarding device to use the first path and the second path as load-sharing paths and use the third path to perform reroute protection on the first path and the second path, and generates the flow entry for instructing to perform the operation of going to the first group entry; and the sending module 302 delivers the flow entry and the first group entry to the forwarding device, so that when the load-sharing path fails, the forwarding device uses, according to the first group entry, the third path instead for packet forwarding. This embodiment can resolve a problem that fast reroute protection cannot be implemented when there are multiple load-sharing paths in a network and any one of the load-sharing paths fails, effectively reduce a packet loss rate, and improve processing efficiency when a failure occurs, thereby ensuring that packets can be forwarded normally.

Optionally, on a basis of the embodiment corresponding to FIG. 6-1, in a first optional embodiment of this embodiment of the application, the first group entry includes a first group type field and a first action bucket field, the first group type field is used to indicate that a current group is a scenario including the load-sharing paths and the reroute protection path, and the first action bucket field is used to indicate that the first path and the second path are load-sharing paths for the data flow and that forwarding states of the first path and the second path are both active, and used to indicate that the third path is a rerouting path when the load-sharing path fails and that a forwarding state of the third path is inactive.

Optionally, on a basis of the first optional embodiment, in a second optional embodiment of this embodiment of the application, the first action bucket field includes a first sub action bucket, a second sub action bucket, and a third sub action bucket, the first sub action bucket indicates that the first path is a load-sharing path for the data flow and that the forwarding state of the first path is active, the second sub action bucket indicates that the second path is a load-sharing path for the data flow and that the forwarding state of the second path is active, and the third sub action bucket indicates that the third path is a rerouting path when the load-sharing path fails and that the forwarding state of the third path is inactive.

Optionally, on a basis of any one of the embodiment corresponding to FIG. 6-1, or the first to the second optional embodiments, in a third optional embodiment of this embodiment of the application, the first group entry further includes a first group identifier; and that the flow entry is used to instruct the forwarding device to perform an operation of going to the first group entry when the data flow is matched includes:

the flow entry includes a match field and an operation instruction field, the match field carries match information of the data flow, and the operation instruction field carries the first group identifier for instructing to go to the first group entry. According to this optional embodiment, a relationship between the first group entry and the flow entry is configured, so that a packet of the data flow can be sent to the first group entry by using the flow entry. In a network environment in which a data service requirement is not high and a network architecture is not complex, an objective of reducing a packet loss rate and improving network stability can be achieved.

Optionally, on a basis of any one of the embodiment corresponding to FIG. 6-1, or the first to the third optional embodiments, in a fourth optional embodiment of this embodiment of the application, the processing module 301 is further configured to:

generate a second group entry for the data flow, where the second group entry includes a second group identifier, a second group type field, and a second action bucket field, the second group identifier is used to identify the second group entry, the second group type field is used to indicate load sharing, the second action bucket field includes a fourth sub action bucket, and the fourth sub action bucket carries the first group identifier for instructing to go to the first group entry; and that the flow entry is used to instruct the forwarding device to perform an operation of going to the first group entry when the data flow is matched includes:

the flow entry includes a match field and an operation instruction field, the match field carries match information of the data flow, and the operation instruction field carries the second group identifier for instructing to go to the second group entry.

When the packet goes from the second group entry to the first group entry, a structure of a concatenation relationship between the first group entry and the second group entry as shown in FIG. 2-3 may be used for an implementation. In this optional embodiment, a multi-level group table formed by the first group table and the second group table further ensures normal forwarding of the packet, and the packet first goes to the second group entry. Hierarchical processing is implemented, and division of work is definite. This effectively improves forwarding processing efficiency, optimizes a forwarding mechanism, and improves packet processing efficiency.

Optionally, on a basis of any one of the second to the fourth optional embodiments, in a fifth optional embodiment of this embodiment of the application, referring to FIG. 6-2, the control device 30 further includes a receiving module 303, where the receiving module 303 is configured to receive a first notification message from the forwarding device after the sending module 302 sends the flow entry and the first group entry to the forwarding device, where the first notification message indicates that the first path fails;

the processing module 301 is further configured to:

set, according to the first notification message received by the receiving module 303, a forwarding state of the first sub action bucket to inactive and a forwarding state of the third sub action bucket to active, so as to update the first group table; and the sending module 302 is further configured to send the updated first group entry to the forwarding device.

Optionally, on a basis of the fifth optional embodiment, in a sixth optional embodiment of this embodiment of the application, after the sending module 302 sends the updated first group entry to the forwarding device, the receiving module 303 is further configured to:

receive a second notification message from the forwarding device, where the second notification message indicates that the first path recovers from the failure;

the processing module 301 is further configured to:

set, according to the second notification message, the forwarding state of the first sub action bucket to active and the forwarding state of the third sub action bucket to inactive, so as to update the first group table; and the sending module 302 is further configured to send the first group entry that is updated again to the forwarding device, so that the forwarding device uses, according to the updated first group table, the third path instead to forward the packet.

Optionally, on a basis of any one of the second to the fourth optional embodiments, in a seventh optional embodiment of this embodiment of the application, after the sending module 302 sends the flow entry and the first group entry to the forwarding device, the receiving module 303 is further configured to:

receive a third notification message from the forwarding device, where the third notification message indicates that the first path fails;

the processing module 301 is further configured to set, according to the third notification message received by the receiving module 303, the first path corresponding to the first sub action bucket to a path used for rerouting, a forwarding state of the first sub action bucket to inactive, the third path corresponding to the third sub action bucket to a path used for load sharing, and a forwarding state of the third sub action bucket to active; and the sending module 302 is further configured to send the updated first group entry to the forwarding device.

In this optional embodiment, in a reroute protection mechanism formed by the first to the third paths, when the first path or the second path fails, the third path can be immediately used instead to complete forwarding of the data flow. This avoids a problem of service interruption caused by discarding a packet sent to a failed port.

Figures 1, 7:
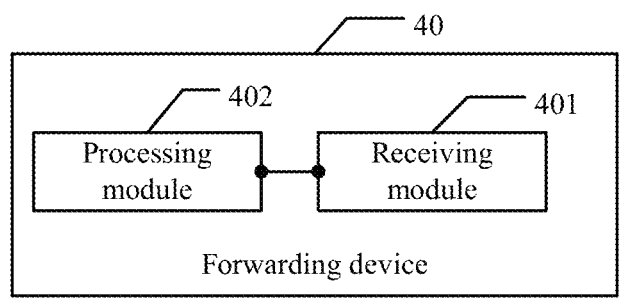
Figures 2, 7:
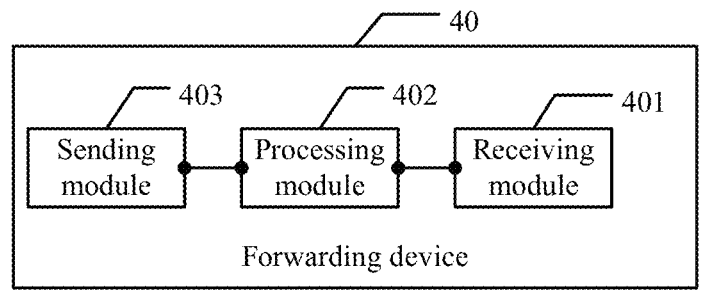

The foregoing describes the control device. The following describes a forwarding device according to an embodiment of the application. The forwarding device 40 is applied to a network in which control is separated from forwarding, where the network in which control is separated from forwarding includes a control device and the forwarding device 40, and the control device controls the forwarding device 40. Referring to FIG. 7-1, the forwarding device 40 includes:

a receiving module 401, configured to receive a flow entry and a first group entry from the control device, where the flow entry is used to instruct the forwarding device to perform an operation of going to the first group entry when the data flow is matched, the first group entry is used to instruct the forwarding device to set a first path and a second path in at least three paths computed by the control device for the data flow as load-sharing paths and set a third path in the at least three paths as a reroute protection path for the first path and the second path, and the at least three paths are paths for transmitting the data flow from the forwarding device to a destination forwarding device; and a processing module 402, configured to: create a flow table according to the flow entry received by the receiving module 401, and create a first group table according to the first group entry received by the receiving module 401.

In this embodiment of the application, the processing module 401 configures the flow table according to the flow entry delivered by the control device, and configures the first group table by using the first group entry, so that when the load-sharing first path and second path fail, the third path in charge of reroute protection may be used instead according to the first group table. This embodiment can resolve a problem that fast reroute protection cannot be implemented when there are multiple load-sharing paths in a network and any one of the load-sharing paths fails, effectively reduce a packet loss rate, and improve processing efficiency when a failure occurs, thereby ensuring that packets can be forwarded normally.

Optionally, on a basis of the embodiment corresponding to FIG. 7-1, in a first optional embodiment of this embodiment of the application, the first group entry includes a first group type field and a first action bucket field, the first group type field is used to indicate that a current group is a scenario including the load-sharing paths and the reroute protection path, and the first action bucket field is used to indicate that the first path and the second path are load-sharing paths for the data flow and that forwarding states of the first path and the second path are both active, and used to indicate that the third path is a rerouting path when the load-sharing path fails and that a forwarding state of the third path is inactive.

In this optional embodiment, when the first path or the second path fails, the third path may be quickly used according to an indication of a third sub action bucket to forward a packet. This can improve network reliability and data continuity.

Optionally, on a basis of the first optional embodiment, in a second optional embodiment of this embodiment of the application, the first action bucket field includes a first sub action bucket, a second sub action bucket, and a third sub action bucket, the first sub action bucket indicates that the first path is a load-sharing path for the data flow and that the forwarding state of the first path is active, the second sub action bucket indicates that the second path is a load-sharing path for the data flow and that the forwarding state of the second path is active, and the third sub action bucket indicates that the third path is a rerouting path when the load-sharing path fails and that the forwarding state of the third path is inactive.

Optionally, on a basis of any one of the embodiment corresponding to FIG. 7-1, or the first to the second optional embodiments, in a third optional embodiment of this embodiment of the application, the first group entry further includes a first group identifier; and that the flow entry is used to instruct the forwarding device to perform an operation of going to the first group entry when the data flow is matched includes:

the flow entry includes a match field and an operation instruction field, the match field carries match information of the data flow, and the operation instruction field carries the first group identifier for instructing to go to the first group entry.

A relationship between the first group entry and the flow entry is configured, so that a packet of the data flow can be sent to the first group entry by using the flow entry. For details, refer to a flowchart for forwarding a packet in a forwarding device as shown in FIG. 3. According to this optional embodiment, in a network environment in which a data service requirement is not high and a network architecture is not complex, an objective of reducing a packet loss rate and improving network stability can be achieved.

Optionally, on a basis of any one of the embodiment corresponding to FIG. 7-1, or the first to the second optional embodiments, in a fourth optional embodiment of this embodiment of the application, the receiving module 401 is further configured to:

receive a second group entry from the control device;

the processing module 402 is further configured to create a second group table according to the second group entry, where the second group entry includes a second group identifier, a second group type field, and a second action bucket field, the second group identifier is used to identify the second group entry, the second group type field is used to indicate load sharing, the second action bucket field includes a fourth sub action bucket, and the fourth sub action bucket carries the first group identifier for instructing to go to the first group entry; and that the flow entry is used to instruct the forwarding device to perform an operation of going to the first group entry when the data flow is matched includes:

the flow entry includes a match field and an operation instruction field, the match field carries match information of the data flow, and the operation instruction field carries the second group identifier for instructing to go to the second group entry.

In this optional embodiment, a multi-level group table formed by the first group table and the second group table further ensures normal forwarding of the packet, and the packet first goes to the second group entry. Hierarchical processing is implemented, and division of work is definite. This effectively improves forwarding processing efficiency, optimizes a forwarding mechanism, and improves packet processing efficiency.

Optionally, on a basis of the third or the fourth optional embodiment, in a fifth optional embodiment of this embodiment of the application, the processing module 401 is specifically configured to:

after the receiving module 401 receives a packet of the data flow from another forwarding device, search the flow table by using identifier information of the data flow, after the flow entry is matched, perform an action of going to the first group table corresponding to the first group identifier, and after the packet goes to the first group table, forward the packet on the first path or the second path in load sharing mode according to indications of the first sub action bucket and the second sub action bucket; and when detecting that the first path fails, set a forwarding state of the first sub action bucket to inactive and a forwarding state of the third sub action bucket to active, so as to update the first group table; and correspondingly, the processing module 402 forwards the packet on the third path or the second path in load sharing mode.

In this optional embodiment, in a reroute protection mechanism formed by the first to the third paths, when the first path or the second path fails, the third path can be immediately used instead to complete forwarding of the data flow. This avoids a problem of service interruption caused by discarding a packet sent to a failed port.

Optionally, on a basis of the fifth optional embodiment, in a sixth optional embodiment of this embodiment of the application, referring to FIG. 7-2, the forwarding device 40 further includes a sending module 403, where the sending module 403 is specifically configured to:

after the processing module 402 sets the forwarding state of the third sub action bucket to active, send a first notification message to the control device, where the first notification message indicates that the first path fails;

the receiving module 401 is further configured to receive an updated first group entry from the control device, where the updated first group entry indicates that the forwarding state of the first sub action bucket is inactive, and indicates that the forwarding state of the third sub action bucket is active; and the processing module 402 is further configured to update the first group table according to the updated first group entry.

In this optional embodiment, in the reroute protection mechanism formed by the first to the third paths, when the first path or the second path fails, the third path can be immediately used instead to complete forwarding of the data flow. This avoids a problem of service interruption caused by discarding a packet sent to a failed port.

Optionally, on a basis of the sixth optional embodiment, in a seventh optional embodiment of this embodiment of the application, when detecting that the first path recovers from the failure, the processing module 402 is further configured to set the forwarding state of the first sub action bucket to active and the forwarding state of the third sub action bucket to inactive; and correspondingly, the processing module 402 is further configured to forward the packet on the first path in load sharing mode.

Optionally, on a basis of any one of the second to the fourth optional embodiments, in an eighth optional embodiment of this embodiment of the application, after the processing module 402 creates the flow table according to the flow entry, and creates the first group table according to the first group entry, the processing module 401 is further configured to: after the receiving module 401 receives a packet of the data flow from another forwarding device, search the flow table by using identifier information of the data flow, after the flow entry is matched, perform an action of going to the first group table corresponding to the first group identifier, and after the packet goes to the first group table, forward the packet on the first path or the second path in load sharing mode according to indications of the first sub action bucket and the second sub action bucket; and set the first path corresponding to the first sub action bucket to a path used for rerouting, a forwarding state of the first sub action bucket to inactive, the third path corresponding to the third sub action bucket to a path used for load sharing, and a forwarding state of the third sub action bucket to active when the forwarding device detects that the first path fails, so as to update the first group table; and correspondingly, the processing module 402 forwards the packet on the third path or the second path in load sharing mode. In this optional embodiment, when the first path fails, the first path is used as an FRR path, so that after the first path recovers from the failure, reroute protection may be performed on the second path and the third path. This effectively avoids a problem of data transmission interruption generally caused by immediately switching back to the first path after the first path recovers in the prior art.

Figure 8:
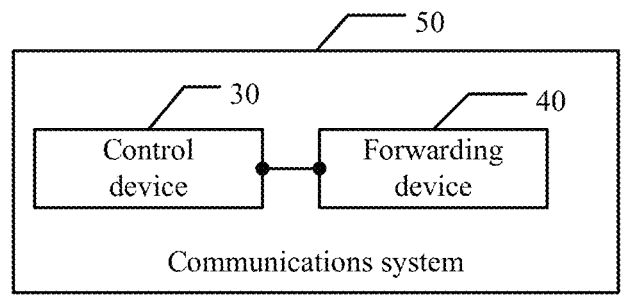
FIG. 8 is a schematic structural diagram of a communications system according to an embodiment of the application.

The application further provides a communications system. The communications system 50 is applied to a network in which control is separated from forwarding. Referring to FIG. 8, the communications system 50 includes:

the control device 30 described in any one of the embodiment corresponding to FIG. 6-1, or the first to the sixth optional embodiments; and the forwarding device 40 described in any one of the embodiment corresponding to FIG. 7-1, or the first to the eighth optional embodiments.

In this embodiment of the application, the control device 30 configures the first path and the second path in charge of load sharing for the data flow, configures the third path in charge of reroute protection, generates the first group entry for instructing the forwarding device 40 to use the first path and the second path as load-sharing paths and use the third path to perform reroute protection on the first path and the second path, generates the flow entry for instructing to perform the operation of going to the first group entry, and delivers the flow entry and the first group entry to the forwarding device, so that when the load-sharing path fails, the forwarding device uses, according to the first group entry, the third path instead for packet forwarding. This embodiment can resolve a problem that fast reroute protection cannot be implemented when there are multiple load-sharing paths in a network and any one of the load-sharing paths fails, effectively reduce a packet loss rate, and improve processing efficiency when a failure occurs, thereby ensuring that packets can be forwarded normally.

The application further provides a computer storage medium. The medium stores a program, and when the program runs, some or all of the steps in the routing method are performed.

The application further provides a computer storage medium. The medium stores a program, and when the program runs, some or all of the steps in the routing method performed by the control device or the forwarding device are performed.

Figure 9:
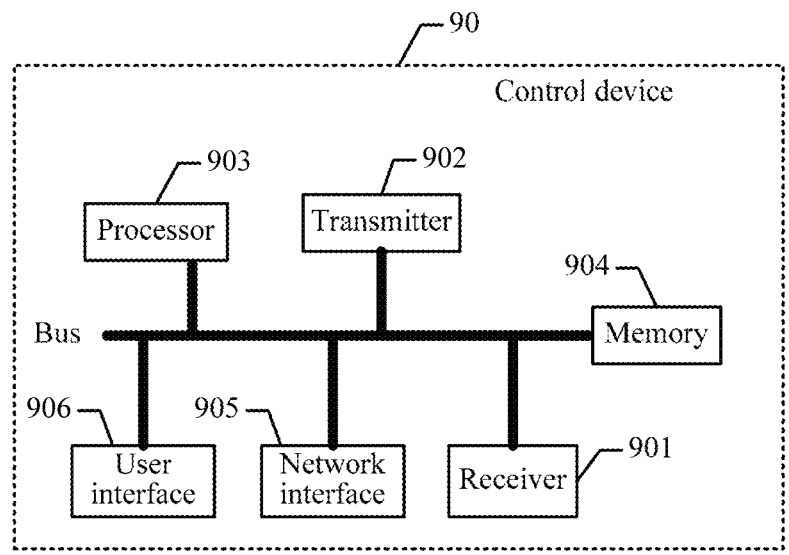
FIG. 9 is another schematic structural diagram of a control device according to an embodiment of the application.

FIG. 9 is another schematic structural diagram of a control device 90 according to an embodiment of the application. The control device 90 may include at least one receiver 901, at least one transmitter 902, at least one processor 903, a memory 904, and at least one network interface 905 or another user interface 906, so as to implement connection and communication between the apparatuses. The at least one network interface (wired or wireless), and the Internet, a wide area network, a local network, a metropolitan area network, or the like may be used to implement communication and connection between the system gateway and at least another network element.

The memory 904 may include a read-only memory and a random access memory, and provide an instruction and data to the processor 903. A part of the memory 904 may further include a high-speed random access memory (RAM, Random Access Memory), or may further include a non-volatile memory (non-volatile memory).

The memory 904 stores the following elements, executable modules or data structures, or a subset thereof, or an extended set thereof:

operation instructions, including various operation instructions, used to implement various operations; and an operating system, including various system programs, used to implement various basic services and process hardware-based tasks.

In this embodiment of the application, the control device 90 is applied to a network in which control is separated from forwarding, where the network in which control is separated from forwarding includes the control device 90 and a forwarding device, and the control device 90 controls the forwarding device. The processor 903 performs the following operations by invoking an operation instruction stored in the memory 904 (the operation instruction may be stored in the operating system):

determining at least three paths for a data flow, and generating a first group entry and a flow entry for the data flow, where the at least three paths are paths for transmitting the data flow from the forwarding device to a destination forwarding device; and sending the flow entry and the first group entry to the forwarding device by using the transmitter 902, where the flow entry is used to instruct the forwarding device to perform an operation of going to the first group entry when the data flow is matched, and the first group entry is used to instruct the forwarding device to set a first path and a second path in the at least three paths as load-sharing paths and set a third path in the at least three paths as a reroute protection path for the first path and the second path.

The first group entry includes a first group type field and a first action bucket field, the first group type field is used to indicate that a current group is a scenario including the load-sharing paths and the reroute protection path, and the first action bucket field is used to indicate that the first path and the second path are load-sharing paths for the data flow and that forwarding states of the first path and the second path are both active, and used to indicate that the third path is a rerouting path when the load-sharing path fails and that a forwarding state of the third path is inactive.

Optionally, the first action bucket field includes a first sub action bucket, a second sub action bucket, and a third sub action bucket, the first sub action bucket indicates that the first path is a load-sharing path for the data flow and that the forwarding state of the first path is active, the second sub action bucket indicates that the second path is a load-sharing path for the data flow and that the forwarding state of the second path is active, and the third sub action bucket indicates that the third path is a rerouting path when the load-sharing path fails and that the forwarding state of the third path is inactive.

Optionally, the first group entry further includes a first group identifier; and that the flow entry is used to instruct the forwarding device to perform an operation of going to the first group entry when the data flow is matched includes:

the flow entry includes a match field and an operation instruction field, the match field carries match information of the data flow, and the operation instruction field carries the first group identifier for instructing to go to the first group entry.

In some implementations, the processor 903 may further perform the following step:

generating a second group entry for the data flow, where the second group entry includes a second group identifier, a second group type field, and a second action bucket field, the second group identifier is used to identify the second group entry, the second group type field is used to indicate load sharing, the second action bucket field includes a fourth sub action bucket, and the fourth sub action bucket carries the first group identifier for instructing to go to the first group entry; and that the flow entry is used to instruct the forwarding device to perform an operation of going to the first group entry when the data flow is matched includes:

the flow entry includes a match field and an operation instruction field, the match field carries match information of the data flow, and the operation instruction field carries the second group identifier for instructing to go to the second group entry.

In some implementations, after the control device sends the flow entry and the first group entry to the forwarding device, the processor 903 may further perform the following steps:

receiving, by using the receiver 901, a first notification message sent by the forwarding device, where the first notification message indicates that the first path fails; and setting, according to the first notification message, a forwarding state of the first sub action bucket to inactive and a forwarding state of the third sub action bucket to active; and sending, by using the transmitter 902, the updated first group entry to the forwarding device.

In some implementations, after the control device sends the updated first group entry to the forwarding device, the processor 903 may further perform the following steps:

receiving, by using the receiver 901, a second notification message sent by the forwarding device, where the second notification message indicates that the first path recovers from the failure;

setting, according to the second notification message, the forwarding state of the first sub action bucket to active and the forwarding state of the third sub action bucket to inactive; and sending, by using the transmitter 902, the first group entry that is updated again to the forwarding device.

In some implementations, after the control device sends the updated first group entry to the forwarding device, the processor 903 may further perform the following steps:

receiving, by using the receiver 901, a third notification message from the forwarding device, where the third notification message indicates that the first path fails;

setting, according to the third notification message, the first path corresponding to the first sub action bucket to a path used for rerouting, a forwarding state of the first sub action bucket to inactive, the third path corresponding to the third sub action bucket to a path used for load sharing, and a forwarding state of the third sub action bucket to active; and sending, by using the transmitter 902, the updated first group entry to the forwarding device.

Figure 10:
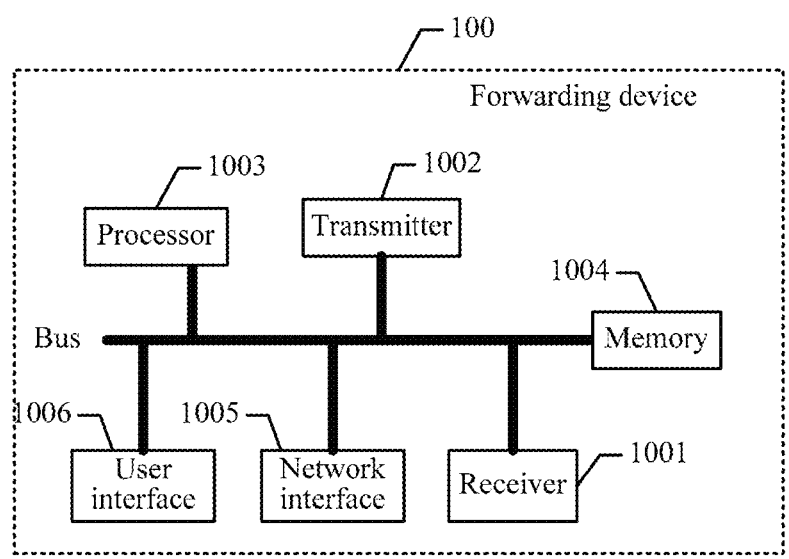
FIG. 10 is another schematic structural diagram of a forwarding device according to an embodiment of the application.

FIG. 10 is another schematic structural diagram of a forwarding device 100 according to an embodiment of the application. The forwarding device 100 may include at least one receiver 1001, at least one transmitter 1002, at least one processor 1003, a memory 1004, and at least one network interface 1005 or another user interface 1006, so as to implement connection and communication between the apparatuses. The at least one network interface (wired or wireless), and the Internet, a wide area network, a local network, a metropolitan area network, or the like may be used to implement communication and connection between the system gateway and at least another network element.

The memory 1004 may include a read-only memory and a random access memory, and provide an instruction and data to the processor 1003. A part of the memory 1004 may further include a high-speed random access memory (RAM, Random Access Memory), or may further include a non-volatile memory (non-volatile memory).

The memory 1004 stores the following elements, executable modules or data structures, or a subset thereof, or an extended set thereof:

operation instructions, including various operation instructions, used to implement various operations; and an operating system, including various system programs, used to implement various basic services and process hardware-based tasks.

In this embodiment of the application, the forwarding device is applied to a network in which control is separated from forwarding, where the network in which control is separated from forwarding includes a control device and the forwarding device, and the control device controls the forwarding device. The processor 1003 performs the following operations by invoking an operation instruction stored in the memory 1004 (the operation instruction may be stored in the operating system):

receiving a flow entry and a first group entry from the control device by using the receiver 1001, where the flow entry is used to instruct the forwarding device to perform an operation of going to the first group entry when the data flow is matched, the first group entry is used to instruct the forwarding device to set a first path and a second path in at least three paths computed by the control device for the data flow as load-sharing paths and set a third path in the at least three paths as a reroute protection path for the first path and the second path, and the at least three paths are paths for transmitting the data flow from the forwarding device to a destination forwarding device; and creating a flow table according to the flow entry, and creating a first group table according to the first group entry.

The first group entry includes a first group type field and a first action bucket field, the first group type field is used to indicate that a current group is a scenario including the load-sharing paths and the reroute protection path, and the first action bucket field is used to indicate that the first path and the second path are load-sharing paths for the data flow and that forwarding states of the first path and the second path are both active, and used to indicate that the third path is a rerouting path when the load-sharing path fails and that a forwarding state of the third path is inactive.

Optionally, the first action bucket field includes a first sub action bucket, a second sub action bucket, and a third sub action bucket, the first sub action bucket indicates that the first path is a load-sharing path for the data flow and that the forwarding state of the first path is active, the second sub action bucket indicates that the second path is a load-sharing path for the data flow and that the forwarding state of the second path is active, and the third sub action bucket indicates that the third path is a rerouting path when the load-sharing path fails and that the forwarding state of the third path is inactive.

Optionally, the first group entry further includes a first group identifier; and that the flow entry is used to instruct the forwarding device to perform an operation of going to the first group entry when the data flow is matched includes:

the flow entry includes a match field and an operation instruction field, the match field carries match information of the data flow, and the operation instruction field carries the first group identifier for instructing to go to the first group entry.

In some implementations, the processor 1003 specifically performs the following step:

receiving a second group entry from the control device by using the receiver 1001, and creating a second group table according to the second group entry, where the second group entry includes a second group identifier, a second group type field, and a second action bucket field, the second group identifier is used to identify the second group entry, the second group type field is used to indicate load sharing, the second action bucket field includes a fourth sub action bucket, and the fourth sub action bucket carries the first group identifier for instructing to go to the first group entry; and that the flow entry is used to instruct the forwarding device to perform an operation of going to the first group entry when the data flow is matched includes:

the flow entry includes a match field and an operation instruction field, the match field carries match information of the data flow, and the operation instruction field carries the second group identifier for instructing to go to the second group entry.

In some implementations, after receiving the flow entry and the first group entry from the control device by using the receiver 1001, the processor 1003 may further perform one of the following operation steps:

after receiving a packet of the data flow from another forwarding device by using the receiver 1001, searching the flow table by using identifier information of the data flow, after the flow entry is matched, performing an action of going to the first group table corresponding to the first group identifier, and after the packet goes to the first group table, forwarding the packet on the first path or the second path in load sharing mode according to indications of the first sub action bucket and the second sub action bucket;

when detecting that the first path fails, setting a forwarding state of the first sub action bucket to inactive and a forwarding state of the third sub action bucket to active, so as to update the first group table; and forwarding the packet on the third path or the second path in load sharing mode.

In some implementations, after the forwarding device sets the forwarding state of the first sub action bucket to inactive and the forwarding state of the third sub action bucket to active when the forwarding device detects that the first path fails, so as to update the first group table, the processor 1003 may further perform the following steps:

sending a first notification message to the control device by using the transmitter 1002, where the first notification message indicates that the first path fails;

receiving an updated first group entry from the control device by using the receiver 1001, where the updated first group entry indicates that the forwarding state of the first sub action bucket is inactive, and indicates that the forwarding state of the third sub action bucket is active; and updating the first group table according to the updated first group entry.

In some implementations, the processor 1003 may further perform the following steps:

when detecting that the first path recovers from the failure, setting the forwarding state of the first sub action bucket to active and the forwarding state of the third sub action bucket to inactive; and forwarding the packet on the first path in load sharing mode.

In some implementations, after creating the flow table according to the flow entry, and creating the first group table according to the first group entry, the processor 1003 may further perform the following steps:

after receiving a packet of the data flow from another forwarding device by using the receiver 1001, searching the flow table by using identifier information of the data flow, after the flow entry is matched, performing an action of going to the first group table corresponding to the first group identifier, and after the packet goes to the first group table, forwarding the packet on the first path or the second path in load sharing mode according to indications of the first sub action bucket and the second sub action bucket;

setting, by the forwarding device, the first path corresponding to the first sub action bucket to a path used for rerouting, a forwarding state of the first sub action bucket to inactive, the third path corresponding to the third sub action bucket to a path used for load sharing, and a forwarding state of the third sub action bucket to active when the forwarding device detects that the first path fails, so as to update the first group table; and forwarding the packet on the third path or the second path in load sharing mode.

In some implementations, after setting the first path corresponding to the first sub action bucket to a path used for rerouting, the forwarding state of the first sub action bucket to inactive, the third path corresponding to the third sub action bucket to a path used for load sharing, and the forwarding state of the third sub action bucket to active when detecting that the first path fails, so as to update the first group table, the processor 1003 may further perform the following steps:

sending a first notification message to the control device, where the first notification message indicates that the first path fails;

receiving an updated first group entry from the control device by using the receiver 1001, where the updated first group entry indicates that the first path corresponding to the first sub action bucket is used for rerouting and that the forwarding state of the first sub action bucket is inactive, and indicates that the third path corresponding to the third sub action bucket is used for load sharing and that the forwarding state of the third sub action bucket is active; and updating the first group table according to the updated first group entry.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, at least two units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on at least two network units. Some or all of the units may be selected according to actual requirements to achieve the objectives of the solutions of the embodiments.

In addition, functional units in the embodiments of the application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the application essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The routing method, the related device, and the system provided by the application are described in detail above. A person of ordinary skill in the art can make variations and modifications in terms of specific implementations and application scopes according to the ideas of the embodiments of the application. Therefore, content of the specification shall not be construed as a limitation to the application.

What is claimed is:

1. A routing method, applied to a network in which control is separated from forwarding, wherein the network comprises a control device and a forwarding device, and the method comprises:
   determining, by the control device, at least three paths for a data flow, wherein the at least three paths are paths between the forwarding device and a destination forwarding device;
   generating, by the control device, a first group entry and a flow entry for the data flow, wherein the first group entry comprises a first group type field, the first group type field indicating that a current group is a scenario comprising load-sharing paths and a reroute protection path; and
   sending, by the control device, the flow entry and the first group entry to the forwarding device, wherein the flow entry instructs the forwarding device to perform an operation of going to the first group entry when the data flow is matched, and the first group entry instructs the forwarding device to set a first path and a second path in the at least three paths as the load-sharing paths and set a third path in the at least three paths as the reroute protection path for the first path and the second path.

2. The method according to claim 1, wherein the first group entry further comprises a first action bucket field, wherein the first action bucket field indicates that the first path and the second path are load-sharing paths for the data flow and that forwarding states of the first path and the second path are both active, and wherein the first action bucket field indicates that the third path is a rerouting path when one of the load-sharing path fails and that a forwarding state of the third path is inactive.

3. The method according to claim 2, wherein the first action bucket field comprises a first sub action bucket, a second sub action bucket, and a third sub action bucket, wherein the first sub action bucket indicates that the first path is a load-sharing path for the data flow and that the forwarding state of the first path is active, wherein the second sub action bucket indicates that the second path is a load-sharing path for the data flow and that the forwarding state of the second path is active, and wherein the third sub action bucket indicates that the third path is a rerouting path when one of the load-sharing path fails and that the forwarding state of the third path is inactive.

4. The method according to claim 1, wherein the first group entry further comprises a first group identifier; and
   wherein the instruction of the flow entry to the forwarding device to perform the operation of going to the first group entry when the data flow is matched comprises a match field and an operation instruction field, wherein the match field carries match information of the data flow, and wherein the operation instruction field carries the first group identifier for instructing to go to the first group entry.

5. The method according to claim 1, wherein the method further comprises:
   generating, by the control device, a second group entry for the data flow, wherein the second group entry comprises a second group identifier, a second group type field, and a second action bucket field, wherein the second group identifier identifies the second group entry, wherein the second group type field indicates load sharing, wherein the second action bucket field comprises a fourth sub action bucket, and wherein the fourth sub action bucket carries a first group identifier for instructing to go to the first group entry; and
   wherein the instruction of the flow entry to the forwarding device to perform an operation of going to the first group entry when the data flow is matched comprises a match field and an operation instruction field, wherein the match field carries match information of the data flow, and wherein the operation instruction field carries the second group identifier for instructing to go to the second group entry.

6. A control device, applied to a network in which control is separated from forwarding, wherein the network comprises the control device and a forwarding device, and the control device comprises:
   at least one processor, the at least one processor configured to:
      determine at least three paths for a data flow, wherein the at least three paths are paths between the forwarding device and a destination forwarding device and
      generate a first group entry and a flow entry for the data flow, wherein the first group entry comprises a first group type field, the first group type field indicating that a current group is a scenario comprising load-sharing paths and a reroute protection path; and
   at least one transmitter, the at least one transmitter configured to:
      send the flow entry and the first group entry to the forwarding device, wherein the flow entry instructs the forwarding device to perform an operation of going to the first group entry when the data flow is matched, and wherein the first group entry instructs the forwarding device to set a first path and a second path in the at least three paths as the load-sharing paths and set a third path in the at least three paths as the reroute protection path for the first path and the second path.

7. The control device according to claim 6, wherein the first group entry further comprises a first action bucket field, wherein the first action bucket field indicates that the first path and the second path are load-sharing paths for the data flow and that forwarding states of the first path and the second path are both active, and wherein the first action bucket field indicates that the third path is a rerouting path when one of the load-sharing path fails and that a forwarding state of the third path is inactive.

8. The control device according to claim 7, wherein the first action bucket field comprises a first sub action bucket, a second sub action bucket, and a third sub action bucket, wherein the first sub action bucket indicates that the first path is a load-sharing path for the data flow and that the forwarding state of the first path is active, wherein the second sub action bucket indicates that the second path is a load-sharing path for the data flow and that the forwarding state of the second path is active, and wherein the third sub action bucket indicates that the third path is a rerouting path when one of the load-sharing path fails and that the forwarding state of the third path is inactive.

9. The control device according to claim 6, wherein the first group entry further comprises a first group identifier; and wherein the instruction of the flow entry to the forwarding device to perform the operation of going to the first group entry when the data flow is matched comprises a match field and an operation instruction field, wherein the match field carries match information of the data flow, and wherein the operation instruction field carries the first group identifier for instructing to go to the first group entry.

10. The control device according to claim 6, wherein the at least one processor is further configured to:

generate a second group entry for the data flow, wherein the second group entry comprises a second group identifier, a second group type field, and a second action bucket field, wherein the second group identifier identifies the second group entry, wherein the second group type field indicates load sharing, wherein the second action bucket field comprises a fourth sub action bucket, and wherein the fourth sub action bucket carries a first group identifier for instructing to go to the first group entry; and wherein the instruction of the flow entry to the forwarding device to perform the operation of going to the first group entry when the data flow is matched comprises a match field and an operation instruction field, wherein the match field carries match information of the data flow, and wherein the operation instruction field carries the second group identifier for instructing to go to the second group entry.

11. A forwarding device, applied to a network in which control is separated from forwarding, wherein the network comprises a control device and the forwarding device, and the forwarding device comprises:

at least one receiver, the at least one receiver configured to receive a flow entry and a first group entry from the control device, wherein the first group entry comprises a first group type field, the first group type field indicating that a current group is a scenario comprising load-sharing paths and a reroute protection path, wherein the flow entry instructs the forwarding device to perform an operation of going to the first group entry when the data flow is matched, wherein the first group entry instructs the forwarding device to set a first path and a second path in at least three paths computed by the control device for the data flow as the load-sharing paths and set a third path in the at least three paths as the reroute protection path for the first path and the second path, and wherein the at least three paths are paths between the forwarding device and a destination forwarding device; and at least one processor, the at least one processor configured to:

create a flow table according to the flow entry; and
create a first group table according to the first group entry.

12. The forwarding device according to claim 11, wherein the first group entry further comprises a first action bucket field, wherein the first action bucket field indicates that the first path and the second path are load-sharing paths for the data flow and that forwarding states of the first path and the second path are both active, and wherein the first action bucket field indicates that the third path is a rerouting path when one of the load-sharing path fails and that a forwarding state of the third path is inactive.

13. The forwarding device according to claim 12, wherein the first action bucket field comprises a first sub action bucket, a second sub action bucket, and a third sub action bucket, wherein the first sub action bucket indicates that the first path is a load-sharing path for the data flow and that the forwarding state of the first path is active, wherein the second sub action bucket indicates that the second path is a load-sharing path for the data flow and that the forwarding state of the second path is active, and wherein the third sub action bucket indicates that the third path is a rerouting path when one of the load-sharing path fails and that the forwarding state of the third path is inactive.

14. The forwarding device according to claim 11, wherein the first group entry further comprises a first group identifier; and wherein the instruction of the flow entry to the forwarding device to perform the operation of going to the first group entry when the data flow is matched comprises a match field and an operation instruction field, wherein the match field carries match information of the data flow, and wherein the operation instruction field carries the first group identifier for instructing to go to the first group entry.

15. The forwarding device according to claim 11, wherein the at least one receiver is further configured to receive a second group entry from the control device; and wherein the at least one processor is further configured to create a second group table according to the second group entry received by the receiving module, wherein the second group entry comprises a second group identifier, a second group type field, and a second action bucket field, wherein the second group identifier identifies the second group entry, wherein the second group type field indicates load sharing, wherein the second action bucket field comprises a fourth sub action bucket, and wherein the fourth sub action bucket carries a first group identifier for instructing to go to the first group entry; and wherein the instruction of the flow entry instructs the forwarding device to perform the operation of going to the first group entry when the data flow is matched comprises a match field and an operation instruction field, wherein the match field carries match information of the data flow, and wherein the operation instruction field carries the second group identifier for instructing to go to the second group entry.

\* \* \* \* \*